(12) United States Patent
Chaudhary et al.

(10) Patent No.: US 11,489,772 B1
(45) Date of Patent: Nov. 1, 2022

(54) PRIME RE-SHUFFLED ASSISTED CARP

(71) Applicant: Citrix Systems, Inc., Fort Lauderdale, FL (US)

(72) Inventors: Aman Chaudhary, Bangalore (IN); Vemula Srimithra, Bangalore (IN); Vinay Shivananda, Bangalore (IN); Raghav Somanahalli Narayana, Bangalore (IN); Arunkanth Abbigari, Bangalore (IN); Anuradha Gupta, Bangalore (IN); Rajesh Joshi, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/398,162

(22) Filed: Aug. 10, 2021

(51) Int. Cl.
*G06F 15/16* (2006.01)
*H04L 45/74* (2022.01)
*H04L 47/125* (2022.01)
*H04L 45/021* (2022.01)
*H04L 45/7453* (2022.01)

(52) U.S. Cl.
CPC .......... *H04L 45/742* (2013.01); *H04L 45/021* (2013.01); *H04L 45/7453* (2013.01); *H04L 47/125* (2013.01)

(58) Field of Classification Search
CPC ........................... H04L 45/7453; H04L 47/125
See application file for complete search history.

(56) References Cited

U.S. PATENT DOCUMENTS

| 6,341,311 | B1* | 1/2002 | Smith | H04L 9/40 707/E17.12 |
|---|---|---|---|---|
| 7,243,148 | B2* | 7/2007 | Keir | G02B 6/12011 709/224 |
| 9,106,482 | B1* | 8/2015 | Bapat | H04L 67/1001 |
| 2002/0048269 | A1* | 4/2002 | Hong | H04L 61/30 370/386 |
| 2014/0195686 | A1* | 7/2014 | Yeager | H04L 67/289 709/226 |
| 2019/0102435 | A1* | 4/2019 | Bishnoi | G06F 16/2471 |

* cited by examiner

*Primary Examiner* — Hieu T Hoang
(74) *Attorney, Agent, or Firm* — Foley & Lardner LLP

(57) ABSTRACT

Improving distribution of traffic from clients to servers is provided. A device intermediary to a plurality of clients and a plurality of servers can receive a request from a client of the plurality of clients to access one of the plurality of servers. The device can determine a hash value based on at least a portion of the request received from the client. The device can identify an index of a plurality of indices listing the plurality of servers repeated a plurality of times in a deterministic shuffled order. The device can apply a cache array routing protocol (CARP) algorithm to a second plurality of servers listed in a subset of the plurality of indices around the index. The device can select a server from the second plurality of servers with a highest hash value based on the application of the CARP algorithm.

20 Claims, 6 Drawing Sheets

PRIME RE-SHUFFLED ASSISTED CARP

FIELD OF THE DISCLOSURE

This application generally relates to data communication networks, including but not limited to systems and methods for balancing loads across servers or remote entities.

BACKGROUND

A client device can initiate a request to transmit data or obtain resources to or from one or more remote servers. To establish a communication channel or a path with at least one of the servers, a load balancer can receive the request from the client device and direct the request to an available server. The load balancer can direct other traffics to one or more servers for handling client requests. The server can receive the request from the client device and transmit a response to the client device including an acknowledgment or the requested resources.

BRIEF SUMMARY

Client devices can transmit data packets to a load balancer for distribution to one or more remote servers. The remote server can include or be a remote device, an application server, a node, or an entity. The load balancer can include or be an application delivery controller ("ADC"). The ADC can use a hash-based load balancing ("LB") algorithm, method, or technique to perform at least one of various key characteristics, such as distributing loads uniformly across the remote servers. For a hash-based LB, the load balancing decision with respect to incoming clients establishing communication channels with the remote servers should remain consistent over time. The balancing decision can refer to the time to select a server to forward the incoming client. Further, the LB decisions should be made in a constant time irrespective of the number of servers. Examples of hash-based LB can include at least a Maglev Hash or Cache Array Routing Protocol ("CARP"). It can be challenging to increase the number of available servers without increasing the amount of time the ADC may take to perform a load balancing determination. Further, as network failures may occur in any deployments, it can be challenging for a hash-based LB method to be resilient to such network failures. For example, if one of the backend server endpoints is not reachable, becomes unavailable, or has gone down, it can be challenging to prevent the failure of the backend server endpoint from negatively impacting the existing clients load balanced to other active or available servers. However, it can be difficult to determine or obtain a hashing method (e.g., hash-based LB) while taking into account the various characteristics, or without sacrificing one or more characteristics, to be achieved from the ADC, such as uniform load distribution, resilience to network failures, and constant time to take an LB decision.

Thus, systems and methods of this technical solution can provide a hashing method of prime re-shuffled assisted CARP ("PRAC") to provide uniform load distribution, resiliency against failures with good performance metrics, and a constant time to make an LB decision. The ADC can use the hashing method PRAC in stateless LB or for deployment in multi-tier LB (e.g., to uniformly distribute traffic from first-tier nodes to second-tier nodes, such as distributing clients to respective backend servers). The ADC can use PRAC in any distributed system for balancing loads to the nodes.

The ADC can use PRAC to provide consistency during server flaps and load distribution with less impact on the central processing unit ("CPU") or reduction in resource consumption by being stateless (e.g., does not maintain state or does not store information of previous server selection or distribution of clients). Further, by using PRAC, the ADC can reduce or maintain the time to take the LB decision to O(1) (e.g., the time taken for load balancing decision), which does not dependent on the number of backend servers. Hence, the ADC can perform load distribution with any number or fluctuation of the number of servers without increasing the LB decision time.

The systems and methods can use the PRAC algorithm or technique to maintain uniform distribution with full consistency (e.g., 100% consistency) during server flaps while maintaining minimal usage of the CPU or resources. By providing consistent distribution during application endpoint changes (e.g., when servers are down or are back up) while maintaining an O(1) performance, the ADC can use PRAC over other algorithms, which may not have a good trade-off between consistency, distribution, and lookup time for load balancing. Some of the other hash-based algorithms can include the Maglev hash and CARP.

For example, the Maglev hash can be used for network load balancing to provide O(1) performance for incoming client hash. The Maglev hash can build a lookup table having a size of 65537 buckets where the servers can be placed into the buckets using a hashing scheme. In Maglev hash, the ADC can give the server to be selected for an incoming hash by calculating hash % BUCKET_SIZE. However, with Maglev hash, the lookup table is generated for any server going up or down and being added or removed. Hence, the Maglev hash can incur a heavy overhead for CPU usage or resource consumption, such as when there are frequent changes in the number of servers due to failures, adding servers, removing servers, among other factors. For example, in a microservice architecture, many nodes or pods can go up or down frequently, resulting in re-computation or re-generation of the lookup table when using the Maglev hash. Further, the Maglev hash does not provide full consistency in load distribution with additional or reduction in the servers (e.g., when adding or removing servers).

In another example, the CARP algorithm can be used for consistent hashing. The hashing method of the CARP algorithm can include computing a combined hash of server hashes. The CARP method can hash the combined hash on one or more parameters in the incoming request including at least one of a Uniform Resource Locator ("URL"), Internet Protocol ("IP") address of the client, among other information included in the data packets transmitted from the client device for all the servers in a server pool. The CARP method can select the server which resulted in the highest combined hash, thereby resulting in a consistent or fair distribution of clients to servers. However, determining the server by computing the combined hash can be slow when using the CARP method alone, resulting in a lookup time of O(N) where N is the number of servers in the server pool. In other words, the lookup time of CARP can be dependent on or respective to the number of servers. Therefore, when using the CARP method, the CPU will spike when distributing traffic across a pool with many backend servers and incur additional operating costs.

The systems and methods can include a device intermediary between clients and servers. The device can use PRAC (e.g., custom hashing method) to achieve good distribution, consistency, and lookup time in the order of O(1). For example, as part of the PRAC method, the device can repeat the servers multiple times (e.g., generate multiple virtual nodes linked to the same respective servers) in the server list in a deterministic shuffling order using prime numbers. When a data packet is received, the device can index the client hash to a specific server index in the hash bucket. After determining the hash bucket, the device can run the CARP algorithm over a predetermined range of servers (e.g., ±8 servers or 16 servers) around the hash bucket in the listing of servers. By computing the CARP, the device can determine the hash value for individual servers around the hash bucket. Based on the hash values, the device can select the server resulting in the highest hash to server the traffic from at least a client. The repeated servers can be virtual nodes linking to or associated with the same server. The generated virtual nodes can occupy the list of servers in nonadjacent positions to their respective (or the same) servers, such that the range of servers around the hash bucket does not include the same servers.

The device can generate the lookup table having a size based on the number of fingers and the number of servers available. The fingers can refer to the number of duplicates for individual servers. For example, if there are three servers and three fingers, the list of servers can include a total of nine nodes (e.g., six of which are virtual nodes directed to the same servers). The device can generate server hashes for individual servers in the list of servers for each iteration up to the total number of fingers. Responsive to the generation, the device can shuffle the server hashes using a deterministic shuffling function. Accordingly, the device can generate a table for selecting one or more servers to serve traffic from client devices.

To select which server to server the traffic from one or more clients, the device can compute a hash on one or more configured parameters, such as URL, IP address, among other information from the respective client devices. The device can use the hash as an index to find the hash bucket for one of the potential servers within a predetermined range (e.g., a window) of servers. The device can apply CAPR over the window of servers represented as indices to determine hash values for individual servers within the window of the list. The device can select the highest hashed server (e.g., server with the highest hash value) for serving the traffic.

With server flaps or when a server goes down, the device may not generate a new table. Instead, the device can perform similar features or functionalities discussed above without considering servers that are unavailable when applying CARP over the window of servers. Hence, the device can ensure that the load is distributed among other servers and consistency is maintained, since the window remained unchanged for a specific client hash. Further, the device can avoid an increase in resource consumption by not having to regenerate or recreate the table. Thus, by leveraging PRAC to distribute traffic and loads from clients to servers, the systems and methods described herein can at least improve the uniformity of load distribution across backend servers, improve resiliency to network failures, minimize lookup time or the time to take an LB decision, improve CPU performance to a constant time of O(1) with full consistency, and reduce resource consumption, such as from not having to regenerate the lookup table when a server goes down.

In aspects, this disclosure is directed to a method for improving distribution of traffic from clients to servers. The method can include receiving, by a device that is intermediary to a plurality of clients and a plurality of servers, a request from a client of the plurality of clients to access one of the plurality of servers. The method can include determining, by the device, a hash value based on at least a portion of the request received from the client. The method can include identifying, by the device using the hash value, an index of a plurality of indices listing the plurality of servers repeated a plurality of times in a deterministic shuffled order. The method can include applying, by the device, a cache array routing protocol (CARP) algorithm to a second plurality of servers listed in a subset of the plurality of indices around the index. The method can include selecting, by the device to service the request, a server from the second plurality of servers listed in the subset of the plurality of indices with the highest hash value based on the application of the CARP algorithm.

In some implementations, the method can include determining the hash value by applying a hash function on at least the portion of the request comprising at least one of a uniform resource locator (URL) or an internet protocol (IP) address. In some implementations, the method can include establishing, by the device, the deterministic shuffled order using a second hash function applied to an internet protocol address and listening port of each of the plurality of servers. In some implementations, the method can include establishing, by the device, the plurality of indices listing the plurality of servers using a predetermined number of repetitions of each server of the plurality of servers such that the same server is not listed in adjacent indices of the plurality of indices.

In some implementations, the method can include identifying, by the device, a server flap for a first server in the plurality of servers listed in a first index within the plurality of indices. The method can include skipping, by the device, the first index to identify the second plurality of servers listed in the subset of the plurality of indices around the index, the second plurality of servers absent the first server. The method can include applying, by the device, the CARP algorithm to the subset of the plurality of indices absent the first server, wherein the device maintains the first server in the plurality of indices listing the plurality of servers repeated the plurality of times in the deterministic shuffled order.

In some implementations, one or more prime numbers can be used to list the plurality of servers in the plurality of indices the plurality of times in the deterministic shuffled order. In some implementations, a size of the subset of the plurality of indices can be predetermined to be a number of indices that is less than a number of servers in the plurality of servers. In some implementations, the subset of the plurality of indices can include eight indices before the index and eight indices after the index.

In aspects, this disclosure is directed to a system for improving the distribution of traffic from clients to servers. The system can include a device comprising one or more processors and memory. The device can be intermediary to a plurality of clients and a plurality of servers. The device can receive a request from a client of the plurality of clients to access one of the plurality of servers. The device can determine a hash value based on at least a portion of the request received from the client. The device can identify, using the hash value, an index of a plurality of indices listing the plurality of servers repeated a plurality of times in a deterministic shuffled order. The device can apply a cache array routing protocol (CARP) algorithm to a second plurality of servers listed in a subset of the plurality of indices around the index. The device can select, to service the request, a server from the second plurality of servers listed in the subset of the plurality of indices with a highest hash value based on the application of the CARP algorithm.

In some implementations, the device can determine the hash value by application of a hash function on at least the portion of the request comprising at least one of a uniform resource locator (URL) or an internet protocol (IP) address. In some implementations, the device can establish the deterministic shuffled order using a second hash function applied to an internet protocol address and listening port of each of the plurality of servers. In some implementations, the device can establish the plurality of indices listing the plurality of servers using a predetermined number of repetitions of each server of the plurality of servers such that a same server is not listed in adjacent indices of the plurality of indices.

In some implementations, one or more prime numbers can be used to list the plurality of servers in the plurality of indices the plurality of times in the deterministic shuffled order. In some implementations, a size of the subset of the plurality of indices can be predetermined to be a number of indices that is less than a number of servers in the plurality of servers. In some implementations, the subset of the plurality of indices can include eight indices before the index and eight indices after the index.

In some implementations, the device can identify a server flap for a first server in the plurality of servers listed in a first index within the plurality of indices. The device can skip the first index to identify the second plurality of servers listed in the subset of the plurality of indices around the index, the second plurality of servers absent the first server. The device can apply the CARP algorithm to the subset of the plurality of indices absent the first server, wherein the device maintains the first server in the plurality of indices listing the plurality of servers repeated the plurality of times in the deterministic shuffled order.

In aspects, this disclosure is directed to a non-transitory computer readable medium storing instructions. The instructions, which when executed by one or more processors, can cause the one or more processors to maintain a list of a plurality of servers from which to select a server from the plurality of servers to receive client traffic, wherein each of the plurality of servers are repeated multiple times within the list in a deterministic shuffled order. The non-transitory computer readable medium can compute a hash on at least a portion of a request received from a client to access one of the plurality of servers. The non-transitory computer readable medium can identify, using the hash, an index into the list of the plurality of servers. The non-transitory computer readable medium can apply a cache array routing protocol (CARP) algorithm to a second plurality of servers listed in a window of a predetermined number of indices around the index in the list of the plurality of servers. The non-transitory computer readable medium can select, to service the request of the client, a highest hashed server identified by the CARP algorithm from the second plurality of servers.

In some implementations, the non-transitory computer readable medium can compute the hash on at least the portion of the request comprising at least one of a uniform resource locator (URL) or an internet protocol (IP) address. In some implementations, one or more prime numbers are used to generate the list of the plurality of servers in the deterministic shuffled order. In some implementations, the window of the predetermined number of indices is predetermined to be a number of indices that is less than a number of servers in the plurality of servers.

These and other aspects and implementations are discussed in detail below. The foregoing information and the following detailed description include illustrative examples of various aspects and implementations, and provide an overview or framework for understanding the nature and character of the claimed aspects and implementations.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
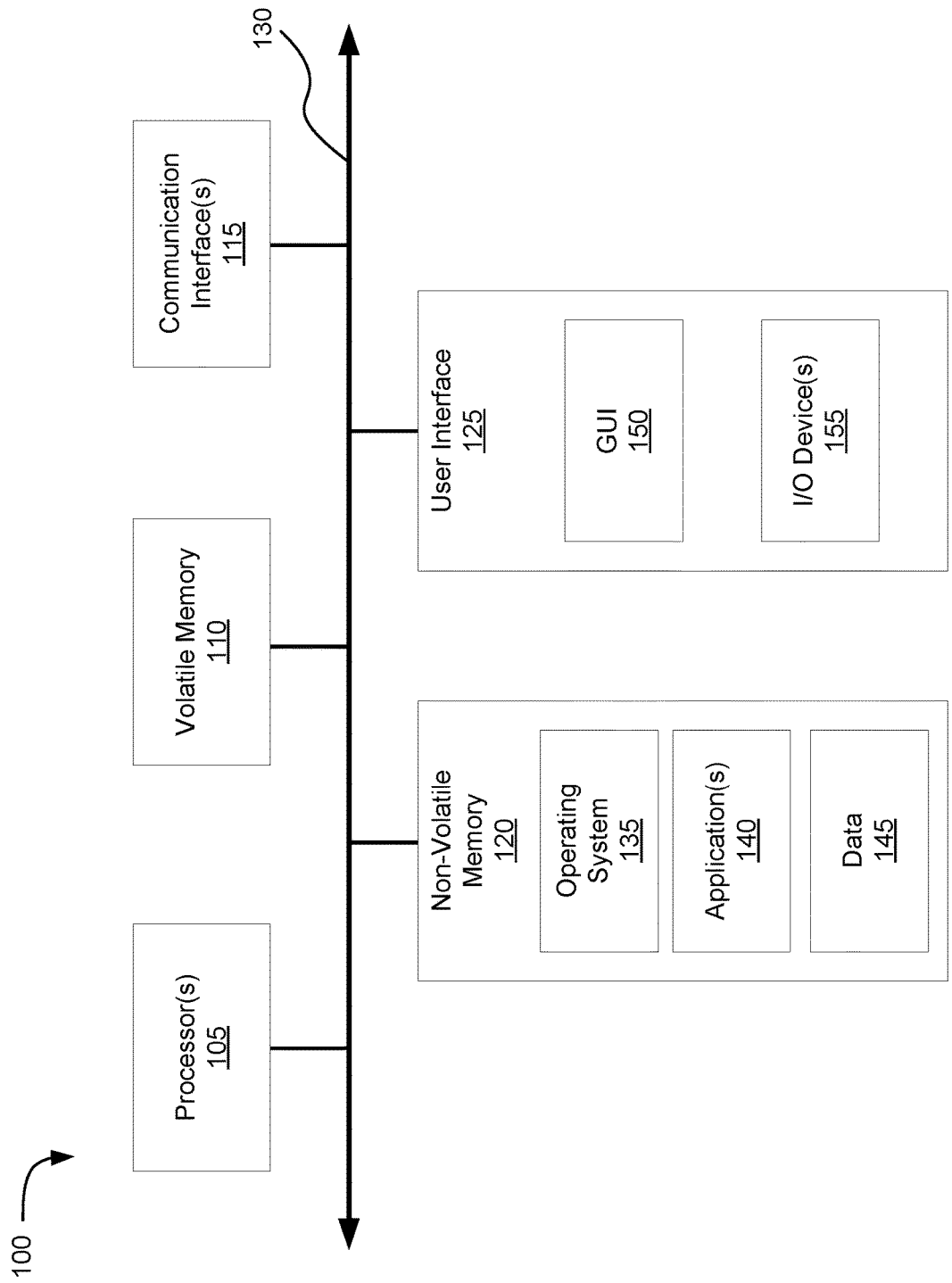
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods of improving load balancing and distribution to nodes of a computing environment.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
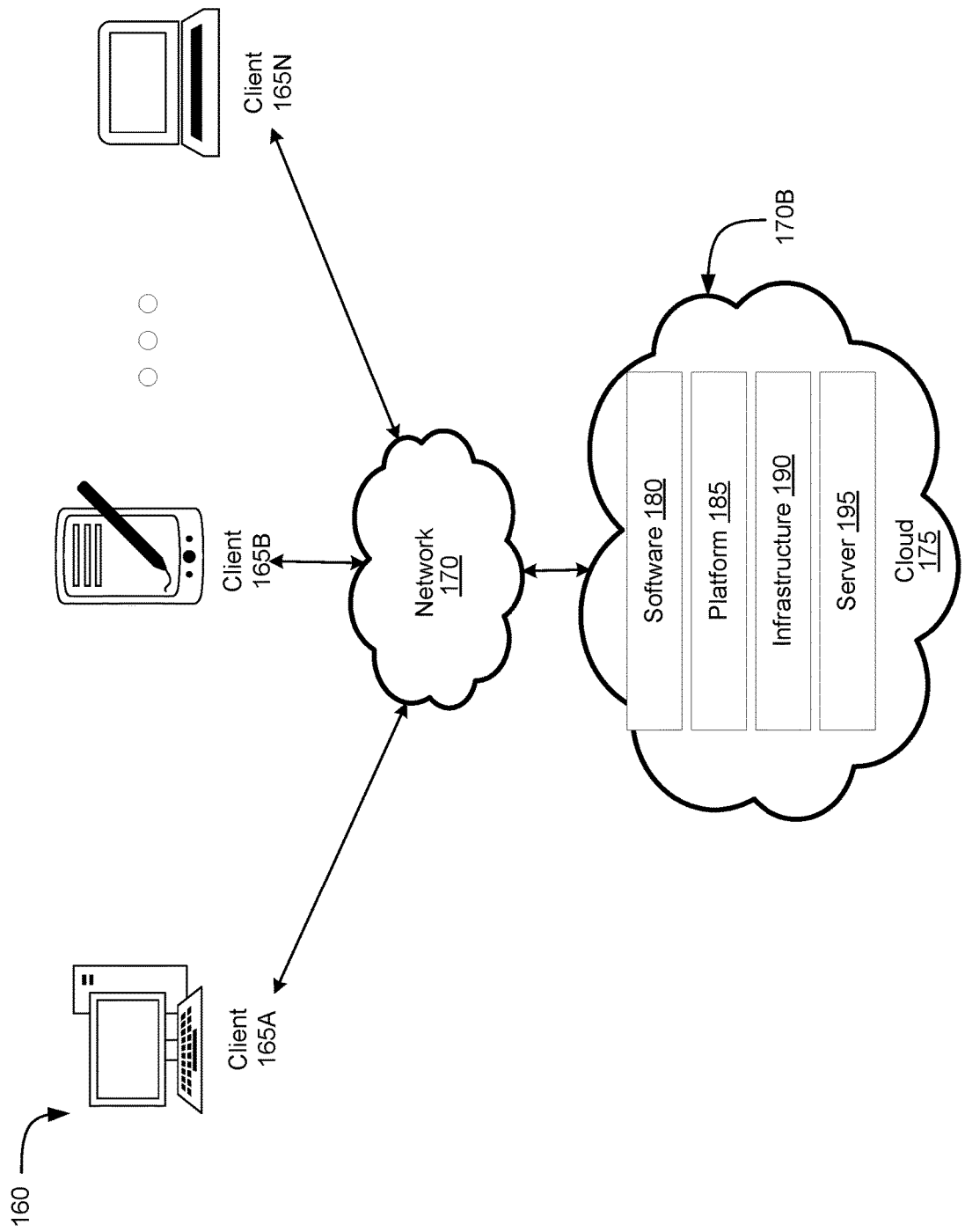
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Systems and Methods of Improving Load Balancing and Distribution

Systems and methods of improving load balancing and distribution to endpoint devices (e.g., servers) are provided. Clients and servers can exchange information or data (e.g., data packets) to perform operations or tasks, access resources, among others by establishing communication sessions. Data sent to the servers can be in the form of traffic, which can be distributed to various servers available in a computing environment. An Application Delivery Controller ("ADC") can manage the distribution or which server to forward the traffic from clients. The ADC can use a hash-based LB algorithm method to distribute the traffic across the servers. However, it can be difficult to determine or obtain a hashing method (e.g., hash-based LB) while taking into account the various characteristics, or without sacrificing one or more characteristics, to be achieved from the ADC, such as uniform load distribution, resilience to network failures, and constant time to make an LB decision.

Examples of some hash-based LBs can include a Maglev Hash and Cache Array Routing Protocol ("CARP"). For example, the Maglev hash can be used for network load balancing to provide O(1) performance for incoming client hash. The Maglev hash can build a lookup table having a size of 65537 buckets where the servers can be placed into the buckets using a hashing scheme. In Maglev hash, the ADC can give the server to be selected for an incoming hash by calculating hash % BUCKET_SIZE. However, with Maglev hash, the lookup table is generated for any server going up or down and being added or removed. Hence, the Maglev hash can incur a heavy overhead for CPU usage or resource consumption, such as when there are frequent changes in the number of servers due to failures, adding servers, removing servers, among other factors. For example, in a microservice architecture, many nodes or pods can be going up or down frequently, resulting in re-computation or re-generation of the lookup table when using the Maglev hash. Further, the Maglev hash does not provide full consistency in load distribution with additional or reduction in the servers (e.g., when adding or removing servers).

In another example, the CARP algorithm can be used for consistent hashing. The hashing method of the CARP algorithm can include computing a combined hash of server hashes. The CARP method can hash the combined hash on one or more parameters in the incoming request including at least one of a Uniform Resource Locator ("URL"), Internet Protocol ("IP") address of the client, among other information included in the data packets transmitted from the client device for all the servers in a server pool. The CARP method can select the server which resulted in the highest combined hash, thereby resulting in a consistent or fair distribution of clients to servers. However, determining the server by computing the combined hash can be slow when using the CARP method alone, resulting in a lookup time of O(N) where N is the number of servers in the server pool. In other words, the lookup time of CARP can be dependent on or respective to the number of servers. Therefore, when using the CARP method, the CPU will spike when distributing traffic across a pool with many backend servers and incur additional operating costs.

Systems and methods of this technical solution can include a device (e.g., an ADC) intermediary between clients and servers that uses prime re-shuffled assisted CARP ("PRAC") hashing technique. The device can use PRAC to provide a uniform load distribution with full consistency (e.g., 100% consistency) during server flaps while using minimal CPU power or resources and maintaining a constant time to take an LB decision. The device can use the hashing method PRAC in stateless LB or for deployment in multi-tier LB (e.g., to uniformly distribute traffic from first-tier nodes to second-tier nodes, such as distributing clients to respective backend servers. The device can use PRAC in any distributed system for balancing network traffic load or requests to the nodes.

The device can use PRAC to provide consistency during server flaps and load distribution with less impact on the central processing unit ("CPU") or reduction in resource consumption by being stateless (e.g., does not maintain state or does not store information of previous server selection or distribution of clients). Further, by using PRAC, the device can reduce or maintain the time to take the LB decision to O(1) (e.g., the time taken for load balancing decision), which does not dependent on the number of backend servers. Hence, the device can perform load distribution with any number or fluctuation of the number of servers without increasing the LB decision time.

The device can generate a table with individual buckets corresponding to a server hash. For example, the device can repeat the servers multiple times (e.g., generate multiple virtual nodes linked to the same respective servers) in the server list in a deterministic shuffling order using prime numbers. The device can generate the lookup table having a size based on the number of fingers and the number of servers available. The number of fingers can refer to how many times individual servers are repeated, e.g., as virtual nodes linked to the respective destination server. The device can generate server hashes for individual servers in the list of servers for each iteration up to the total number of fingers. Responsive to the generation, the device can shuffle the server hashes using a deterministic shuffling function. The device can use the shuffled table to select at least one of the servers for handling the traffic.

The device can select a server for handling the traffic from at least one client using PRAC. For example, the device can compute a hash on one or more configured parameters, such as URL, IP address, among other information from the respective client devices. The device can use the hash as an index to find the hash bucket for one of the potential servers within a predetermined range (e.g., a window) of servers. The device can apply CAPR over the window of servers represented as indices to determine hash values for individual servers within the window of the list. The device can select the highest hashed server (e.g., server with the highest hash value) for serving the traffic.

With server flaps or when a server goes down, the device may not generate a new table. Instead, the device can perform similar features or functionalities discussed above without considering servers that are unavailable when applying CARP over the window of servers. Hence, the device can ensure that the load is distributed among other servers and consistency is maintained, since the window remained unchanged for a specific client hash. Further, the device can avoid an increase in resource consumption by not having to regenerate or recreate the table. Thus, by leveraging PRAC to distribute traffic and loads from clients to servers, the systems and methods described herein can at least improve the uniformity of load distribution across backend servers, improve resiliency to network failures, minimize lookup time or the time to take an LB decision, improve CPU performance to a constant time of O(1) with full consistency, and reduce resource consumption, such as from not having to regenerate the lookup table when a server goes down.

Figure 2:
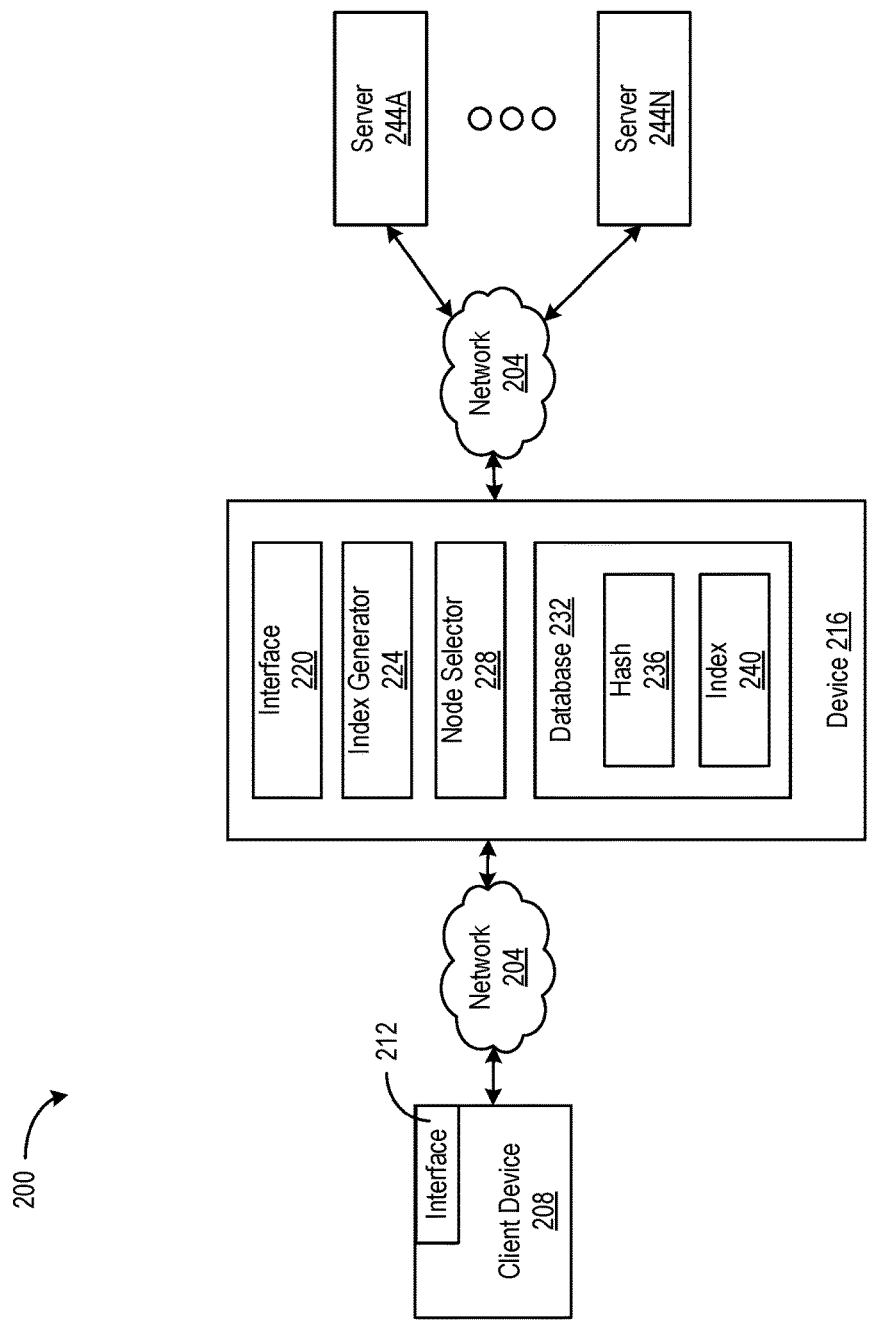
FIG. 2 is a block diagram of a system for improving load balancing and distribution to nodes of a computing environment, in accordance with an embodiment.

Referring now to FIG. 2, depicted is a block diagram of a system 200 for improving load balancing and distribution to nodes (e.g., servers) of a computing environment, in accordance with embodiments. The system 200 can include one or more networks 204, at least one client device 208, at least one device 216, and one or more servers 244A-N (sometimes generally referred to as server(s) 240). The device 216 can include or be an ADC or intermediary appliance executing between the client device 208 and the servers 244. The one or more components (e.g., client device 208, device 216, or servers 244) of the system 200 can establish communication channels or transfer data via the network 204. For example, the client device 208 can communicate with the device 216 through a first network and the device 216 can communicate with servers 244 via a second network. In some cases, the first network and the second network can be the same network 204. In some other cases, the first network and the second network may be different networks bridging or enabling communication between different devices or components of the system 200. The traffic from the client device 208 can be handled by at least one of the servers 244. The device 216 can route or forward the traffic to one of the servers 244.

The network 204 can include computer networks such as the Internet, local, wide, metro or other area networks, intranets, satellite networks, other computer networks such as voice or data mobile phone communication networks, and combinations thereof. The network 204 may be any form of computer network that can relay information between the one or more components of the system 200. The network 204 can relay information between client devices 208 and one or more information sources, such as web servers or external databases, amongst others. In some implementations, the network 204 may include the Internet and/or other types of data networks, such as a local area network (LAN), a wide area network (WAN), a cellular network, a satellite network, or other types of data networks. The network 204 may also include any number of computing devices (e.g., computers, servers, routers, network switches, etc.) that are configured to receive and/or transmit data within the network 204. The network 204 may further include any number of hardwired and/or wireless connections. Any or all of the computing devices described herein (e.g., client device 208, device 216, servers 244, etc.) may communicate wirelessly (e.g., via WiFi, cellular, radio, etc.) with a transceiver that is hardwired (e.g., via a fiber optic cable, a CAT5 cable, etc.) to other computing devices in the network 204. Any or all of the computing devices described herein (e.g., client device 208, device 216, servers 244, etc.) may also communicate wirelessly with the computing devices of the network 204 via a proxy device (e.g., a router, network switch, or gateway). In some implementations, the network 204 can be similar to or can include the network 170 or a computer network accessible to the computer 100 described herein above in conjunction with FIG. 1A or 1B.

The system 200 can include or interface with at least one client device 208 (or various client devices 208). Client device 208 can include at least one processor and a memory, e.g., a processing circuit. The client device 208 can include various hardware or software components, or a combination of both hardware and software components. The client devices 208 can be constructed with hardware or software components and can include features and functionalities similar to the client devices 165 described hereinabove in conjunction with FIGS. 1A-B. For example, the client devices 165 can include, but is not limited to, a television device, a mobile device, smart phone, personal computer, a laptop, a gaming device, a kiosk, or any other type of computing device.

The client device 208 can include at least one interface 212 for establishing a connection to the network 204. The client device 208 can communicate with other components of the system 200 via the network 204, such as the device 216 or the servers 244. The interface 212 can include hardware, software, features, and functionalities of at least a communication interface(s) 115 or user interface 125 as described hereinabove in conjunction with FIG. 1A. For example, the client device 208 can communicate data packets with one or more servers 244 through a device 216 intermediate between the client device 208 and the servers 244. The client device 208 can transmit data packets to the device 216 configured to select and forward the data packets from the client device 208 to at least one server 244. In some cases, the client device 208 can communicate with other client devices.

The client device 208 can include, store, execute, or maintain various application programming interfaces ("APIs") in the memory (e.g., local to the client device 208). The APIs can include or be any types of API, such as Web APIs (e.g., open APIs, Partner APIs, Internal APIs, or composite APIs), web server APIs (e.g., Simple Object Access Protocol ("SOAP"), XML-RPC ("Remote Procedure Call"), JSON-RPC, Representational State Transfer ("REST")), among other types of APIs or protocol described hereinabove in conjunction with clients 165 of FIG. 1B. The client device 208 can use at least one of various protocols for transmitting data to the server 244. The protocol can include at least a transmission control protocol ("TCP"), a user datagram protocol ("UDP"), or an internet control message protocol ("ICMP"). The data can include a message, a content, a request, or otherwise information to be transmitted from the client device 208 to a server 244. The client device 208 can establish a communication channel or a communication session with a server 244 selected by the device 216 to maintain uniformity in load balancing across the servers 244. In some cases, the client device 208 can transmit data directly to the device 216. In some other cases, the device 216 can intercept data from the client device 208 and determine which server 244 should be handling information from the client device 208.

The system 200 can include or interface with one or more servers 244. One or more of the servers 244 can include, be, or be referred to as a node, remote devices, remote entities, application servers, or backend server endpoints. The server 244 can be composed of hardware or software components, or a combination of both hardware or software components. The server 244 can include resources for executing one or more applications, such as SaaS applications, network applications, or other applications within a list of available resources maintained by the server 244. The server 244 can include one or more features or functionalities of at least resource management services or other components within the cloud computing environment. The server 244 can communicate with the client device 208 via a communication channel established by the network 204, for example.

The server 244 can receive data packets or traffic from at least the client device 208 via the device 216. The server 244 can be selected by the device 216 to serve or handle the traffic from various clients. The server 244 can be associated with a server hash in a list of servers. The server 244 can be selected by the device 216 using at least one hash-based load balancing ("LB") technique, such as PRAC. The server 244 can establish a communication session with the client device 208 responsive to the device 216 selecting the server 244 to handle the traffic from the client device 208. The server 244 can serve the traffic based on the request or instructions from the client device 208, such as to store information, update or configure data on the server, obtain data from the server, among others. The server 244 can transmit data packets to the client device 208 to acknowledge receipt of the data packets or to satisfy a request, for example. The server 244 can communicate with the client device 208 directly after establishing the communication session. In some cases, the server 244 can transmit data packets to the client device 208 through an intermediary device, such as the device 216.

The system 200 can include at least one device 216. The device 216 can include, be, or be referred to as an intermediary device, an appliance, a data processing system, or an Application Delivery Controller ("ADC"), for example. The device 216 can be composed of hardware or software components, or a combination of hardware and software components. The device 216 can be intermediate between client devices 208 and servers 244. The device 216 can include features or functionalities of an ADC. For instance, the device 216 may manage the request to establish a communication session from the client device 208 to the server 244. The data packets from the client devices 208 to the servers 244 can be referred to as traffic. The device 216 can manage communication flow between the client devices 208 and the servers 244 by forwarding the traffic from the client devices 208 to one or more servers 244. In some cases, the device 216 can manage traffic from the client devices 208 without managing traffic from the servers 244 to the client devices 208. The device 216 may not alter the content of the data packets from the client device 208 or the server 244. The device 216 can include other components (e.g., processors and memory) to perform features and functionalities described herein.

The device 216 can include various components to manage traffic from the client device 208 to the servers 244. The device 216 can include at least one interface 220, at least one index generator 224, at least one node selector 228, and at least one database 232. The database 232 can include at least one hash data storage 236 and at least one index data storage 240. The hash data storage 236 can be referred to generally as hash 236. The index data storage 240 can be referred to generally as index 240. Individual components (e.g., interface 220, index generator 224, node selector 228, or database 232) of the device 216 can be composed of hardware, software, or a combination of hardware and software components. Individual components can be in electrical communication with each other. For instance, the interface 220 can exchange data or communicate with the index generator 224, the node selector 228, or the database 232. The one or more components (e.g., the interface 220, the index generator 224, the node selector 228, or the database 232) of the device 216 can be used to perform features or functionalities discussed herein, such as uniformly balance or distribute loads across different servers 244 or lookup at least a server 244 to handle requests from the client device 208.

The interface 220 can interface with the network 204, devices within the system 200 (e.g., client devices 208 or servers 244), or components of the device 216. The interface 220 can include features and functionalities similar to the communication interface 115 to interface with the aforementioned components, such as in conjunction with FIG. 1A. For example, the interface 220 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 220 can include at least a built-in network adapter, network interface card, PCMCIA network card, EXPRESSCARD network card, card bus network adapter, wireless network adapter, USB network adapter, modem, or any other device suitable for interfacing one or more devices within the system 200 to any type of network capable of communication. The interface 220 can communicate with one or more aforementioned components to receive data from client devices 208 for forwarding to one of the servers 244 to perform load balancing.

The device 216 can include an index generator 224. The index generator 224 can be referred to as a hash generator or a table generator. The index generator 224 can be configured to generate a table including hashes or indices associated with various servers 244. The index generator 224 can store the generated table having hash buckets in the database 232. For instance, the index generator 224 can store the table in the hash storage 236, which can be accessible to the node selector 228 to select one or more servers 244 for serving requests from the client devices 208. The index generator 224 can perform the features, steps, or methods discussed herein to generate the table including hash buckets.

The index generator 224 can generate a lookup table having a size of n by m indexes. The n can refer to or indicate the number of servers 244 available in the computing environment to handle requests from client devices 208. The m can refer to or indicate the number of fingers within the table. The fingers can be or refer to virtual nodes associated with the servers 244. The number of fingers can refer to the number of times individual servers are repeated in the list of hash buckets. For instance, the index generator 224 can generate n number of servers for a total of m number of iterations. Hence, for each iteration up to m, the index generator 224 can generate n server hashes as discussed herein.

In another example, if n is 20 and m is 4, the index generator 224 can generate a table with a size of 80 (e.g., 20×4), representing the total selectable fingers in the table. The 80 fingers can be associated with 20 hash buckets associated with the respective servers 244 for handling the access requests from the client device 208. In some cases, the fingers can be considered as hash buckets, such that the index generator 224 can generate a table including a size totaling the number of available hash buckets. In this case, and referring to the previous example, the index generator 224 can generate a table having 80 hash buckets, where individual sets of 4 hash buckets are associated with the respective server 244.

The number of iterations can be a predetermined number of repetitions of each of the servers 244. For example, the index generator 224 can establish the indices listing the servers 244 using a predetermined number of repetitions (e.g., m) of each of the servers 244. The value of m can be configured by the administrator of the device 216. For example, the administrator can instruct the index generator 224 to configure or set m to 4, 8, 16, 20, 25, or other values. The index generator 224 can configure the predetermined number of repetitions such that the same server 244 is not listed in adjacent indices of the various indices when generating the table. For instance, the index generator 224 can separate indices of each set of indices representing a server 244, such that indices of the same server 244 are not adjacent to each other. In some cases, the index generator 224 can use the deterministic shuffling (e.g., discussed herein) to order the indices such that the same servers 244 are not listed adjacent to each other.

As part of generating the table, the index generator 224 can generate n server hashes or hash buckets for m iterations. The server hash can correspond to or be a finger hash value, which can be denoted as FHV or generally as FH in this case. The index generator 224 can compute the FHV for the individual fingers, such as an FHV for all iterations of individual servers 244. For instance, if there are 5 servers 244 and 4 iterations, the index generator 224 can compute a total of 20 FHV (e.g., 5×4 fingers). The index generator 224 can generate the finger hash value by using formula (1).

$$FH(S_i,j)=FHF(F_1(S_i),F_2(j))|j\in\{1,2,3,\ldots,m\} \quad (1)$$

The index generator 224 can generate the FHV using a finger hash function denotes as FHF. The index generator 224 can use Si and j as inputs into the FHF, where Si denotes the $i^{th}$ server and j denotes a member of or a subset of individual counts of iterations up to m. The j can represent which iteration the index generator 224 is calculating the FHV for, such as from 1 to m. The $i^{th}$ server can be or refer to the server 244 represented by the FHV, when calculated by the index generator 224. For instance, if m is 4, j can be at least a member, an element, or a subset of $\{1, 2, 3, 4\}$. In this example, j can be $\{1\}$, $\{2\}$, $\{3\}$, $\{4\}$, $\{1, 2\}$, $\{1, 3\}$, $\{1, 4\}$, $\{2, 3\}$, $\{2, 4\}$, $\{3, 4\}$, $\{1, 2, 3\}$, $\{1, 2, 4\}$, $\{1, 3, 4\}$, $\{2, 3, 4\}$, or $\{1, 2, 3, 4\}$. The index generator 224 can use formula (1) to compute the finger hash value such that j is at least a member or a subset of the values or counts up to m.

As part of the FHF, the index generator 224 can use $F_1(S_i)$ and $F_2(j)$ as inputs for the FHF. The index generator 224 can compute $F_1$ using formula (2) and compute $F_2$ using formula (3).

$$F_1(S_i)=SHF(IP(S_i),Port(S_i)) \quad (2)$$

$$F_2(j)=<pj|p\in> \quad (3)$$

The SHF can denote any server hash function for computing a server hash value based on the IP(Si) and the Port(Si). The SHF can be any hash function for computing a hash value for the server 244. For example, the SHF can include any hashing algorithm or hash function, such as RipeMD, Tiger, xxhash, MD5, SHA-2, or CRC32 hash algorithm. The IP can denote the Internet Protocol ("IP") address of the server 244. The IP can be a string of numbers represented as a set of four numbers, such as 192.0.0.5, 127.0.0.1, 172.16.0.9, among other addresses assigned to individual servers 244. Individual numbers of the IP address can range from 0 to 255. For the IP(Si), the index generator 224 can use one or more values or a set of values from the IP for computing $F_1$.

The Port can denote the listener port of the server 244. In this case, the server 244 can refer to the $i^{th}$ server that the index generator 224 is calculating the FHV for. In some cases, the Port can be other ports of the server 244, such as a registered port ranging from 1024 to 49151, dynamic port ranging from 49152 to 65535, or any well-known port ranging from 0 to 1023. The index generator 224 can compute a single value for $F^1$ by using a SHF on the values of IP and Port, as in formula (2).

The index generator 224 can use other types of values corresponding to the server 244 to calculate $F_1$, such as other server ports, an identification of the server, version number of the server 244, or the date that the server 244 is in service. The index generator 224 can use the same types of values to calculate the FHV for all individual fingers. Hence, the index generator 224 can calculate $F_1$ using one or more values corresponding to the server 244. In some cases, index generator 224 may use one value from the server 244 (e.g., IP or Port) as the $F_1$. In this case, the index generator 224 may not need to use any SHF.

The index generator 224 can use formula (3) to determine a value for $F_2$. The index generator 224 can determine $F_2$ based on the total number of fingers available for selection. The P can represent a listing or a group of prime numbers such that P=<P1, P2, . . . , PN>. The index generator 224 can use any prime number when calculating $F_2$. For example, the prime numbers can include 3, 5, 7, 11, 13, 17, 19, 23, 29, 233, 499, 641, etc. In some cases, the set of prime numbers P may be provided by the administrator of the device 216. The index generator 224 can use the same set of prime numbers for calculating FHV for individual fingers. The p of equation (3) can represent at least a member or a subset of the prime number set P. The index generator 224 can select the prime number based on the value of j. For instance, the index generator 224 can use the same prime number for calculating $F_2$ of fingers within the same iteration and a different prime number for calculating $F_2$ in a different iteration. Hence, for a first iteration for calculating the FHV of the servers 244, the index generator 224 can use P1 as the prime number, P2 for the second iteration, P3 for a third iteration, etc. The total amount of prime numbers in the P set can be greater than, less than, or equal to m. In some cases, the index generator 224 can use the same prime number for $F_2$ for calculating any FHV of the fingers. Hence, the index generator 224 can use one or more prime numbers to calculate for FHV of the fingers.

After computing or determining the values of $F_1$ and $F_2$, the index generator 224 can determine the hash value for the $i^{th}$ finger using the FHF. The FHF can be equated with a hash function having the values of $F_1$ and $F_2$ as inputs, as in formula (4).

$$FHF(a,b)=H(a\hat{\ }b) \quad (4)$$

The H function can represent any hash function, similar to SHF. For instance, the index generator 224 can use the same hash function for H as SHF. In some cases, the index generator 224 can use a different hash function for H compared to SHF. The inputs a and b can be used for computing the FHV. In view of the previous example, the input a can include the value of $F_1$, and the input b can include the value of $F_2$. The index generator 224 can calculate the exclusive or ("xor") between a and b, where the xor operation can be denoted as "^". The index generator 224 can calculate an xor between two or more values using the denoted "^" herein. The index generator 224 can use the result of $a\hat{\ }b$ as an input into the hash function H. Accordingly, the index generator 224 can determine FHV based on formulas (1-4). The index generator 224 can use formula (5) which can include the combination of formulas (1-4) to compute the hash value for individual fingers.

$$FH(Si,j)=FHF(F_1(Si),F_2(j))=H(F_1(Si)\hat{\ }F_2(j))=H(SHF(IP(Si),Port(Si))\hat{\ }pj) \quad (5)$$

where $j \in \{1, 2, 3, \ldots, m\}$, $p \in P$, and P=<P1, P2, . . . , PN>

The index generator 224 can shuffle the server hashes (sometimes referred to as finger hashes or server hash values) for the server hashes generated in each iteration. The index generator 224 can use formula (6) for shuffling the server hashes.

$$SH(j)=SF(S1,S2,\ldots,SN)|j\in\{1,2,3,\ldots,m\} \quad (6)$$

The individual server hashes can be denoted as S1, S2, . . . , SN. The index generator 224 can shuffle a table of server hashes to provide a random distribution of server hashes. Shuffling the server hashes can refer to the sorting of the FHV. For example, the index generator 224 can use at least one of any deterministic shuffling function or technique, denoted as SF for shuffling the server hashes. For a shuffle to be deterministic, shuffling a list of server hashes can yield the same random order of server hashes. For instance, the index generator can obtain or determine a random order of the server hashes from shuffling the hash list. Using the same hash list prior to shuffling, the index generator 224 can obtain the same random order when shuffling the hash list using the same deterministic shuffling function. For example, the deterministic shuffling function can include at least a deterministic bucketing, naïve deterministic bucketing, stable deterministic bucketing, or shuffling using random values as keys to determine the order of the server hashes. In some cases, the FHV can be sorted based on the respective values, such as in ascending or descending order. Hence, the order of the FHV can be deterministic for a given set of servers 244.

The index generator 224 can store the shuffled server hashes or indices associated with the respective servers 244 in the hash storage 236. In some cases, if one or more servers 244 go down, become unavailable, or are removed from the system 200, the index generator 224 can remove the index or server hash corresponding to the unavailable server 244. In some cases, the index generator 224 can mark the index as unavailable, such that the ordering of the indices remains the same. The server 244 can become unavailable due to server flaps, an update to the server 244, or removal by an administrator of the server 244. Subsequent to the server 244 being back online or become available, index generator 224 can mark the index as available for handling requests from the client device 208.

A server 244 can be added into the system 200. The index generator 224 can generate an additional index, server hash, or finger hash value for the added server 244. Based on the value of m, the index generator 224 can generate multiple fingers or indices linked, associated with, or directed to the server 244. In some cases, the index generator 224 can add the indices of the server 244 into the shuffled list or table of indices. For example, the index generator 224 can insert the indices in various positions, such that the window applied to the table does not include multiple indices representing the same server 244. In some other cases, the index generator 224 can add the indices of the server 244 into the non-shuffled list of indices. In this case, the index generator 224 can use the same deterministic shuffling function to shuffle the table including the indices associated with the added server 244.

In some cases, the index generator 224 can use a second hash function (e.g., a second server hash function) for establishing the deterministic shuffled order. For example, the index generator 224 can apply a second hash function to an IP address and the listening port of individual servers 244 when calculating the FHV. The second hash function can be different from the server hash function applied to the IP address and the listening port of the servers 244. Based on the server hash function applied on the parameter of the servers 244, the index generator 224 can establish or determine different deterministic shuffled orders for indices listing the servers 244. For example, the FHV for individual servers 244 can differ based on the server hash function applied to the parameters. Different SHF can alter the magnitude of the FHV for individual servers 244, such that the index generator 224 can establish a different deterministic shuffled order for the servers 244.

The index generator 224 can use the following pseudocode to generate the FHV and the table including the server hashes. For example, the index generator 224 can iterate the calculation of FHV from 1 to m for individual servers 244 of 1 to n. The Sj.hashValue can represent or be equated with the FHV of formula (1). In this example, after computing the server hashes for each iteration, the index generator 224 can shuffle the array or list servers 244 from 1 to n, prior to calculating the hash values for the next iteration of servers 244. In some cases, the index generator 224 can shuffle the entire table after computing the server hashes for all iterations from 1 to m.

for i in 1→m
   for j in 1→n
      Sj.hashValue=FH(F1(Sj),Pi)
   done
   SF(S1, S2, . . . , SN)
done The device 216 can include a node selector 228 (sometimes referred to as a hash selector or a server selector) configured to select a node (or a server 244) for forwarding data packets from the client device 208. The node selector 228 can be configured to provide good distribution and consistency of traffic to the one or more servers 244. Distribution can refer to or be described as the evenness of how the access requests (e.g., items or traffic) are distributed across the servers 244 or buckets. Having good consistency can refer to or be described as having no movements from items in various buckets aside from one or more buckets that are removed from the list of available servers 244 (e.g., a list of buckets) or have gone down. For instance, if a bucket is removed from the list of buckets, the items from the removed bucket can be forwarded or moved to the other buckets. No other movements should occur for items in other buckets. Further, if the bucket is brought back into the list of buckets or back online, only items previously moved to other buckets during the removal of the bucket should be moved back to the bucket. Accordingly, in this example, consistency can describe the movements of items from a removed bucket or lack of movements of items from other buckets in the list.

The node selector 228 can receive a request from a client device 208 to access one of the servers 244 of the system 200. In some cases, the node selector 228 can receive an indication that the interface 220 received an access request from a client device 208. For instance, the node selector 228 can receive instructions from one or more processors of the device 216 to select a node for handling the client request. The node selector 228 can initiate the process for selecting a node to handle the client request to access at least one server 244 in response to receiving the server access request.

The node selector 228 can determine a hash value (sometimes referred to as a client hash) based on at least a portion of the request received from the client device 208. The portion can be referred to as a parameter configured by the device 216 to compute a hash value for associating with a server hash or an index in the hash table. The parameter can be configured by the administrator of the device 216 for compatibility between the hash value computed using the parameter of the request and the finger hash value computed based on parameters (e.g., IP address and Port) of individual servers 244. The hash value can include, be, or be referred to as a finger hash value, an index, a server hash, or a node value. For example, the request to access at least a server 244 can include a uniform resource locator (URL), an internet protocol ("IP") address (e.g., source IP address and destination IP address), a protocol version used for communication with the network 204, a method to be performed on the resource accessed using the URL, or other information retrievable from the request or message from the client device 208. The method can include at least one of OPTION, GET, HEAD, POST, PUT, DELETE, TRACE, or CONNECT, for example. As an example, the node selector 228 can use the URL or the IP address for determining the hash value as discussed herein.

The node selector 228 can apply a hash function on at least a portion of the request from the client device 208. For instance, the node selector 228 can apply a hash function on the URL and the IP address of the request. The node selector 228 can aggregate the values of the URL and the IP address for applying the hash function. The node selector 228 can aggregate the values by multiplying, adding, exponentiating, subtracting, dividing, or by using other aggregation techniques on the values. In some cases, the node selector 228 can use one of the parameters in the request from the client device 208. For example, the node selector 228 can apply a hash function to the URL for determining the hash value. In another example, the node selector 228 can apply the hash function to the IP address instead of the URL to determine the hash value.

Responsive to determining the hash value based on at least a configured parameter of the request, the node selector 228 can identify an index of various indices listing the servers 244. The node selector 228 can retrieve or obtain the table of indices listing the servers 244 from the hash storage 236. In some cases, the node selector 228 can receive the table of indices from the index generator 224 responsive to generating the table. The table can include the indices of the servers 244 repeated multiple times (e.g., m times). The indices of the table can be in a deterministic shuffled order. For example, prior to retrieving the table for server selection, the index generator 224 can shuffle the indices using a deterministic shuffling function. Accordingly, the node selector 228 can retrieve a shuffled table in the deterministic shuffled order.

The index can refer to or be associated with a hash bucket. For instance, the node selector 228 can index the client hash value to find a hash bucket. The hash bucket can be one of the potential servers 244 for serving the client request. With the indexed hash value, the node selector 228 can apply a cache array routing protocol ("CARP") algorithm to various servers 244 listed in a subset of the indices within the table. The subset of indices can be around the index or the client hash value determined based on applying a hash function on the parameter of the client request. The node selector 228 can apply the CARP algorithm on the subset having a predetermined size around the index. The predetermined size of the subset can be a number of indices that is less than the number of servers 244 available to serve the traffic. For example, if there are a total of 10 servers 244, the size of the subset can be 9 or less. The size of the subset can represent the size of a window around the index. The node selector 228 can select at least one server 244 within the window to server the access request. In further example, if there are 10 servers 244, 4 fingers (e.g., 4 iterations of individual servers 244), and a window size of 5, the node selector 228 can apply CARP on 5 indices out of the 40 indices to determine a server 244 to forward the access request.

In some cases, the node selector 228 can be configured with a predetermined window size for applying CARP on the indices. The window size can be configured by the administrator of the device 216. For example, the subset of the indices can include eight indices before and eight indices after the index, which can be denoted as ±8 indices of the indexed hash value (e.g., client hash value). The ±8 indices can start from the indexed hash value, such that the window can extend 8 indices beyond the indexed hash and 8 indices before the indexed hash value. The 8 indices beyond or the 8 indices before the indexed hash value can include the index hash value, such that the window size is 16 in this case. The node selector 228 can use other window sizes, such as 8 (e.g., ±4 indices), 10 (e.g., ±5 indices), 20 (±10 indices) 32 (±16 indices), etc.

The node selector 228 can apply or perform CARP on indices within the window. There may be m number of window locations available. For instance, the node selector 228 can select a subset starting at any finger or index within the listing of servers 244. In this case, there can be m windows available for the node selector 228 to index the client hash value to select a server 244. Accordingly, all the servers 244 can have the same probability or chances of being selected to serve the access request from client devices 208.

The node selector 228 can select a server 244 of various servers 244 listed in the subset of indices to service the request from the client device 208. The node selector 228 can perform the selection of a server 244 in response to applying CARP to the indices of servers 244 within the window having a predetermined size. The node selector 228 can select the server 244 having the highest hash value based on the application of the CARP algorithm for servicing the access request. For example, the node selector 228 can determine the hash value for each server 244 within the window of indices by applying the CARP algorithm. The node selector 228 can compare the hash values of the indices within the window to determine which has the highest server hash. Responsive to determining the server 244 having the highest hash, the node selector 228 can select the server 244 to service the request. By determining the hash value using the CARP algorithm and selecting the server 244 with the highest hash value for forwarding the traffic, the node selector 228 can perform a lookup for a server 244 in a constant lookup time of O(1) performance. Further, the performance of the lookup time does not depend on the total number of servers 244, since the node selector 228 can determine a client hash value, apply CARP over a predetermined window size or range around the client hash value, and select the highest hash value for LB. Hence, unlike using CARP for LB, the node selector 228 can achieve uniform load distribution without contributing to a CPU spike, such as when many servers 244 are in the system 200.

As an example, the node selector 228 can select the server 244 or the node to service the request based on the following pseudocode. In this, the pseudocode can describe the process of performing a lookup and selecting a server 244 to forward the access request.

index=HTL(clientHash)
maxCombinedHash=0
bestIndex=index
for i in index−8→index+7
   combinedHash=CH(Si, clientHash)
   if combinedHash>maxCombinedHash
     maxCombinedHash=combinedHash
     bestIndex=i
   done
done In this example pseudocode, the HTL can denote the hash table lookup for identifying an index based on the client hash value as input. The node selector 228 can mark the client hash value as the current index (e.g., denoted as index) as well as the bestIndex for having the highest hash value within a window of the hash table. The bestIndex can be a placeholder for determining which index has the highest hash value. The node selector 228 can change or update the bestIndex if one or more other hash values are greater than the current bestIndex. The window size can extend from −8 to +7 of the current index. For each index within the window, the node selector 228 can apply the CARP algorithm for each indexed server 244 combined with the client hash value determined based on the parameters of the request. For example, the CARP algorithm can be denoted as CH, having the inputs of Si denoting a server 244 at index i, and clientHash denoting the client hash value based on the parameter of the request. The node selector 228 can compute the combinedHash using CH(Si, clientHash). The node selector 228 can compare the combined hash to a maxCombinedHash, which for the first iteration, the combinedHash will be greater than the maxCombinedHash that is set at zero. The node selector 228 can iterate through the indices within the window, updating the bestIndex in response to computing a combinedHash greater than the maxCombinedHash. The maxCombinedHash can be the combinedHash from the previous iteration through the indices. Therefore, the node selector 228 can determine the bestIndex to be the server hash having the highest combinedHash compared to other hash values within the window.

The node selector 228 can transmit or forward the request from the client device 208 to the selected server 244 for servicing the request. The node selector 228 can transmit the request to the server 244 in response to determining which server 244 within the subset of servers 244 around the computed client hash value have the highest hash value. The node selector 228 can perform a similar lookup process for other incoming requests or traffic.

In some cases, the node selector 228 can identify a server flap for a server 244 of various servers 244 listed in an index of the various indices in a table. In this case, the node selector 228 can skip the index associated with the server 244 with the server flap or the server 244 that became unavailable for handling traffic. The downed server 244 can be referred to as a first server 244 in this case. The node selector 228 can select one or more other nodes or indices of servers 244 for handling the traffic from the first server 244. For example, the node selector 228 can identify various servers 244 listed in the subset of indices around an index computed based on the parameters of the request. the subset of indices can be absent of the index associated with the first server 244. Similar to the process for selecting a server, the node selector 228 can apply the CARP algorithm to the subset of indices absent the first server 244.

In some cases, the node selector 228 can maintain the first server 244 in the subset of indices listing the servers 244 repeated the predetermined number of times in the deterministic shuffled order. By maintaining the first server 244 within the subset of indices, the node selector 228 can consider one less index from the selection process. For example, with a window size of 16 indices, the node selector 228 may select one of the 15 indices. In some cases, the node selector 228 may not maintain the index of the first server in the subset of indices. In this case, the node selector 228 can extend the window or consideration of an index by one, either before or after the subset of indices.

To determine server flaps or if a server 244 is down, the node selector 228 can monitor the backend servers 244 to determine whether the servers 244 are reachable. For example, the node selector 228 can monitor the server 244 within the window or the subset of indices. The node selector 228 can remap the client hash value to a different window or subset of indices having the same window size. The window can have m different combinations based on the number of fingers in the hash table. By accounting for server flaps in this way, the device 216 can distribute the traffic evenly across all the available servers 244.

When identifying a server flap, the node selector 228 may not notify the index generator 224 or the index generator 224 may not re-generate the lookup table of the hash buckets. Hence, the device 216 can reduce resource consumption from having to re-generate the table upon any server flap. With at least the process of performing lookup and handling server flaps, the device 216 can maintain the consistency and distribution of the traffic across the servers 244. As compared to Maglev, the device 216 can be more efficient as the hash table does not need to be re-generated upon server flap event. Further, the device 216 can provide the consistency not available in Maglev, while providing a good lookup time of O(1).

The features or functionalities discussed above can be parts of a PRAC method for LB traffic across servers 244. For example, the device 216 can perform PRAC to generate a table using equation (5). The device 216 can use one or more prime numbers for shuffling the indices within the hash table to obtain a deterministic shuffled order of the indices. The device 216 can perform a lookup for selecting a server 244 by determining the client hash value based on configured parameters of the request. The device 216 can index the client hash value and identify a subset of indices within the window around the index. The device 216 can apply the CARP algorithm for the indices within the window and select the highest hash value (or combined hash values) associated with a server 244 to service the client request. Accordingly, the device 216 can perform PRAC to obtain a good distribution and consistency for LB across the servers 244.

To determine or compute the consistency factor, the device 216 can use formula (7) for determining the consistency factor. The consistency factor can represent a percentage of the consistency of loads to the servers 244.

$$\text{Consistency Factor} = \sum_{i=1, i \neq m}^{k} \frac{((client[i] \cdot beginID == client[i] \cdot endID)?1:0)}{total\_clients} * 100 \quad (7)$$

In formula (7), the beginID and endID can denote or represent the server 244 that was selected for the $i^{th}$ client before and after the server m went down. The calculation can be performed, for example, in a simulation for having server flaps when using the PRAC for distributing loads across servers 244. In this case, the simulation can be conducted with any number of client devices 208 (e.g., 1 million clients). The device 216 can calculate the consistency factor in each iteration. The k can denote the number of client devices 208 providing traffic to the system 200 (or simulation). By computing the consistency factor using PRAC, the device 216 can obtain a consistency factor of 100% as compared to around 95% for Maglev hash, for example.

The device 216 can include a database 232. The database 232 can be referred to as a storage device, a data repository, or a memory. The database 232 can be physical storage volumes and virtual storage volumes or arrays thereof. The database 232 can include, store, or maintain information received from the client device 208. In some cases, the database 232 can store information received from the server 244. For example, the database 232 can store messages received from the client device 208 to be transmitted or forwarded to the server 244. In some cases, the database 232 can temporarily store data from the client device 208. The database 232 can discard or remove data packets from the client device 208 responsive to forwarding the data packets to at least one of the servers 244. The database 232 can store information from devices communicating with the database 232, such as source IP address, destination IP address, size of the message, fields in each message, etc., as allowed by the devices.

The database 232 can include a hash storage 236 and an index storage 240. The hash storage 236 can include, store, or maintain one or more hash tables. Individual hash tables can include indices, hashes, fingers hash values, server hashes, or hash buckets listing the servers 244 available to service traffic from client devices 208. The hash storage 236 can store the table and the indices within the table generated by the index generator 224. The hash storage 236 can be accessed by the index generator 224 for modifying or updating the indices within the hash table. The hash storage 236 can be accessed by the node selector 228 to select an index of a server 244 to handle the client request. The hash storage 236 can store other information related to the hashes, hash table, or listing of servers 244, such as one or more parameters of the servers 244 used to generate server hashes. The hash storage 236 can store finger hash values for individual servers 244, which can be included in the hash table as indices.

The index storage 240 can include, store, or maintain the indices of individual nodes selected by the node selector 228 for one or more client devices 208. For instance, the node selector 228 can determine or select a server 244 to forward access requests from the client device 208. The node selector 228 can store the indices of servers 244 servicing the respective client devices 208 in the index storage 240. In this case, the index storage 240 can include, store, or maintain a table having the client hash values of client devices 208 and the associated indices of servers 244. Accordingly, when receiving incoming traffic from a client device 208 previously accessed a server 244, the node selector 228 can forward additional traffic from the client device 208 to the server 244 indicated in the index table stored in the index storage 240. Therefore, the index storage 240 can facilitate or maintain communication between client devices 208 and the servers 244.

In some cases, the hash storage 236 can store the hash values calculated for the servers 244 and the requests from the client devices 208. Further, in this case, the index storage 240 can store indices of the respective servers 244 for constructing the hash table stored in the hash storage 236. Therefore, the database 232 can store information discussed herein to perform features and functionalities of PRAC for LB.

In some cases, the database 232 can be accessed by the administrator of the device 216 to configure any information within the database 232, such as adding or removing servers 244 from the list of servers 244. The administrator can configure other criterias stored in the database, such as the configured parameters used as inputs for the server hash function SHF, configured parameters for computing the client hash value, one or more prime numbers used to shuffle the indices, number of fingers, or among other configurable information.

Hence, the process of PRAC can include, for example, the device 216 repeating or iterating the servers 244 for a predetermined number of times based on the number of fingers m. The device 216 can shuffle the servers 244 using a prime number (e.g., one randomly selected prime number used for shuffling) to obtain a deterministic shuffling order. When receiving a data packet from the client device 208, the device 216 can run the CARP algorithm over a window around a computed client hash value. Further, the device 216 can select a server 244 having the highest hash value to serve the data packet. The device 216 can generate and shuffle the virtual nodes or indices such that the same server 244 do not occupy adjacent slots in the hash buckets. Thus, by leveraging PRAC to distribute traffic and loads from clients to servers, the device 216 can improve the uniformity of load distribution across backend servers 244, improve resiliency to network failures, minimize lookup time or the time to take an LB decision, improve CPU performance to a constant time of O(1) with full consistency, and reduce resource consumption, such as from not having to regenerate the lookup table when a server goes down.

Figure 3A:
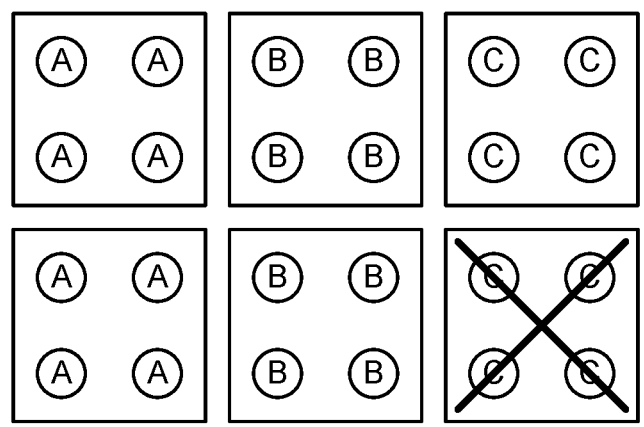
FIGS. 3A-B are example illustrations of distribution of items into buckets, in accordance with an embodiment.
Figure 3B:
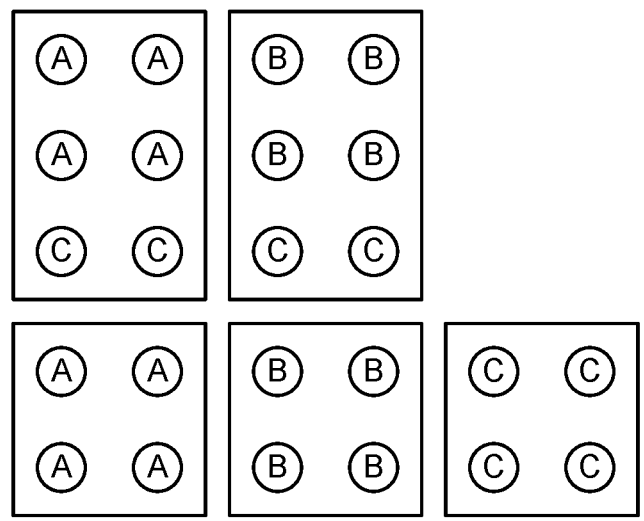

Referring now to FIGS. 3A-B, example illustrations 300A-B of distribution of items into buckets are shown, in accordance with an embodiment. The example features and functionalities described herein can be executed, performed, or otherwise carried out by one or more components of the system 200 (e.g., client device(s) 208, device 216, or servers 244), the computer 100, or any other computing devices described herein in conjunction with FIG. 1A-B and FIG. 2. The illustrations 300A-B can include buckets (e.g., servers 244) serving a number of items representing loads, requests, data packets, or traffic from various client devices 208. The illustrations 300A-B can be used as an example to describe a scenario where the device 216 can provide good distribution and consistency.

In further detail, FIG. 3A illustrates an example illustration 300A with size buckets. In this example, the individual buckets can service, handle, or attend to four items. Since the items are evenly distributed across all buckets, the device 216 can provide a good distribution of m items in n buckets. In example illustration 300A, the m can include 24 items across a total of 6 buckets. Since all buckets are serving the same number of items, the device 216 can provide good distribution in this example (e.g., 100% evenness). The evenness can be calculated by determining the standard deviation of the number of items in each bucket compared to how many items should be in each bucket based on dividing n by m. In this case, dividing n by m can result in an average of how many items should be in each bucket.

With server flaps, a bucket or a server 244 can go down or become unavailable, such as illustrated in illustration 300A having an "X" representing a removal of the bucket index from consideration in the subset.

To maintain good consistency, FIG. 3B illustrates an example illustration 300B of the movement of items "C" when a server 244 goes down. If there are m items placed in n buckets, by removing a bucket, items within the removed buckets may be transferred to other buckets (e.g., n–1 amount of buckets). In this case, no other items should move from servers 244 unaffected by the server flaps. Further, if the removed or downed bucket is brought back, only items previously moved from the removed bucket can be moved to the added bucket. Hence, no other items should move to the added bucket or other buckets. With the item movements in the example illustration 300B, the device 216 can provide consistency in LB of the items. Accordingly, illustrations 300A-B can present example movements of items (e.g., traffic) from one bucket to one or more other buckets as a result of a server flap.

Figure 4:
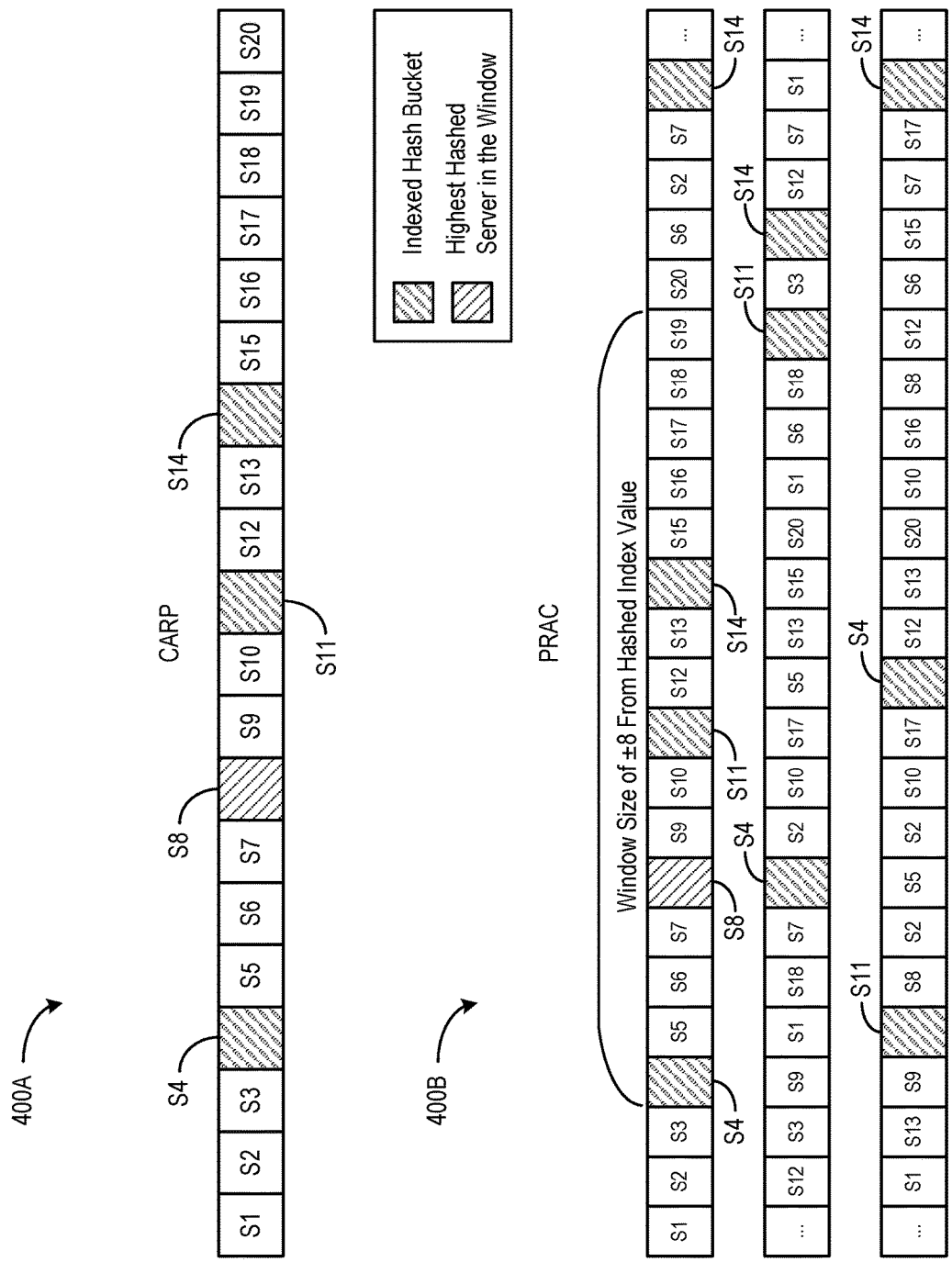
FIG. 4 is an example illustration of the distribution of client hashes, in accordance with an embodiment.

Referring now to FIG. 4, depicted are example illustrations 400A-B of the distribution of client hashes, in accordance with an embodiment. The method or process discussed in example illustrations 400A-B can be executed, performed, or otherwise carried out by one or more components of the system 200 (e.g., client devices 208, device 216, or servers 244), the computer 100, or any other computing devices described herein in conjunction with FIGS. 1A-B. The illustrations 400A-B can include example tables of indices listing server hashes or buckets for serving client requests. The example tables can include 20 available servers 244 for serving the client requests. The illustrations 400A-B can include an indication of one or more indexed hash buckets and the highest hashed server. The highest hashed server in the window can be selected based on applying the CARP algorithm over the various hash buckets of the table.

In further detail, illustration 400A can illustrate a list of 20 servers 244 for applying a CARP algorithm. In this case, the indices listing the servers 244 can be arranged in any order within the table, such as based on the server hash values calculated for each server 244. The servers 244 can be denoted as S1-20. Using the table of illustration 400A, the CARP algorithm can be applied to all 20 servers to determine the server 244 with the highest hash value. Accordingly, illustration 400A can show an example table that the CARP algorithm can be applied to determine a server 244 for servicing the client request. However, with a greater number of servers, such as 1000, 2000, etc., using CARP on all the servers 244 can result in greater resource consumption and increased lookup time.

With the same number of servers (e.g., S1-20), for example, the device 216 can generate a table having indices listing the servers 244 as shown in illustration 300B. This table can be referred to as a PRAC table. To achieve good distribution of client hashes across the servers 244, the device 216 can repeat the various servers 244 in a deterministic shuffling order using one or more prime numbers. The prime numbers can be used to select a slot within the table to occupy the indices. The device 216 can repeat the servers 244 based on the number of fingers for individual servers 244, which can be 4 fingers in this case.

To apply the PRAC algorithm, the device 216 can compute a client hash value based on one or more configured parameters of the request from the client device 208, such as the URL and/or the IP address. The device 216 can index the client hash value into the table. For example, the client hash value can be indexed to server S11 (e.g., hash bucket associated with S11). Responsive to obtaining the indexed hash bucket, the device 216 can apply a window of ±8 indices before and after the index of S11, including S11 as part of the ±8 indices. In this case, the window size can be 16 indices. The window size can be configured by the device 216 based on instructions from the administrator. For example, the device 216 can identify a window including servers S4 to S19 as the potential servers for serving the client request. The order of S4 to S19 can be shuffled to a deterministic shuffled order. For simplicity to illustrate an example, in this case, the S4 to S19 can be arrange based on the server hash value, for example.

The device 216 can apply the CARP algorithm over the window of a predetermined number of indices. The device 216 can select the hash with the highest hash values, such as S8 in this case. Hence, the device 216 can perform PRAC to distribute the load uniformly throughout the servers 244 with good distribution, consistency, lookup time, and reduced resource consumption. The lookup time for the device 216 may not be affected by the number of servers 244 in the list, since the device 216 can obtain one indexed hash bucket and apply CARP over a predetermined number of indices within the window. Although the servers 244 are presented with the same S1-20 in illustration 400B, the individual hash buckets associated with individual servers 244 can include different server hash values based on the iteration for computing the finger hash value for the buckets.

The window size and the number of iterations can be configured by the administrator of the device 216 or dynamically adjusted using a machine learning model. For example, the machine learning model trained using by a machine learning engine can determine the window size or the number of iteration providing a good balance of distribution, consistency, and lookup time. The device 216 can provide the machine learning engine with simulation data to train the machine learning model. The simulation data can include various servers 244 distributed in the table in a deterministic shuffling order. In some cases, the device 216 can train the machine learning model to determine one or more prime numbers to use for shuffling the indices. The device 216 can shuffle the indices such that the same servers 244 are not adjacent to each other. The simulation data can include random client hash values to be indexed into the table. The machine learning model can determine, based on the client hash values, the selected servers 244 for serving the respective requests. The machine learning model can process the simulation to determine the lookup time, distribution, and consistency (e.g., when removing or adding servers 244 using PRAC). Accordingly, the machine learning model can select at least the predetermined number of iterations for generating the indices or the window size to apply the CARP algorithm.

Figure 5:
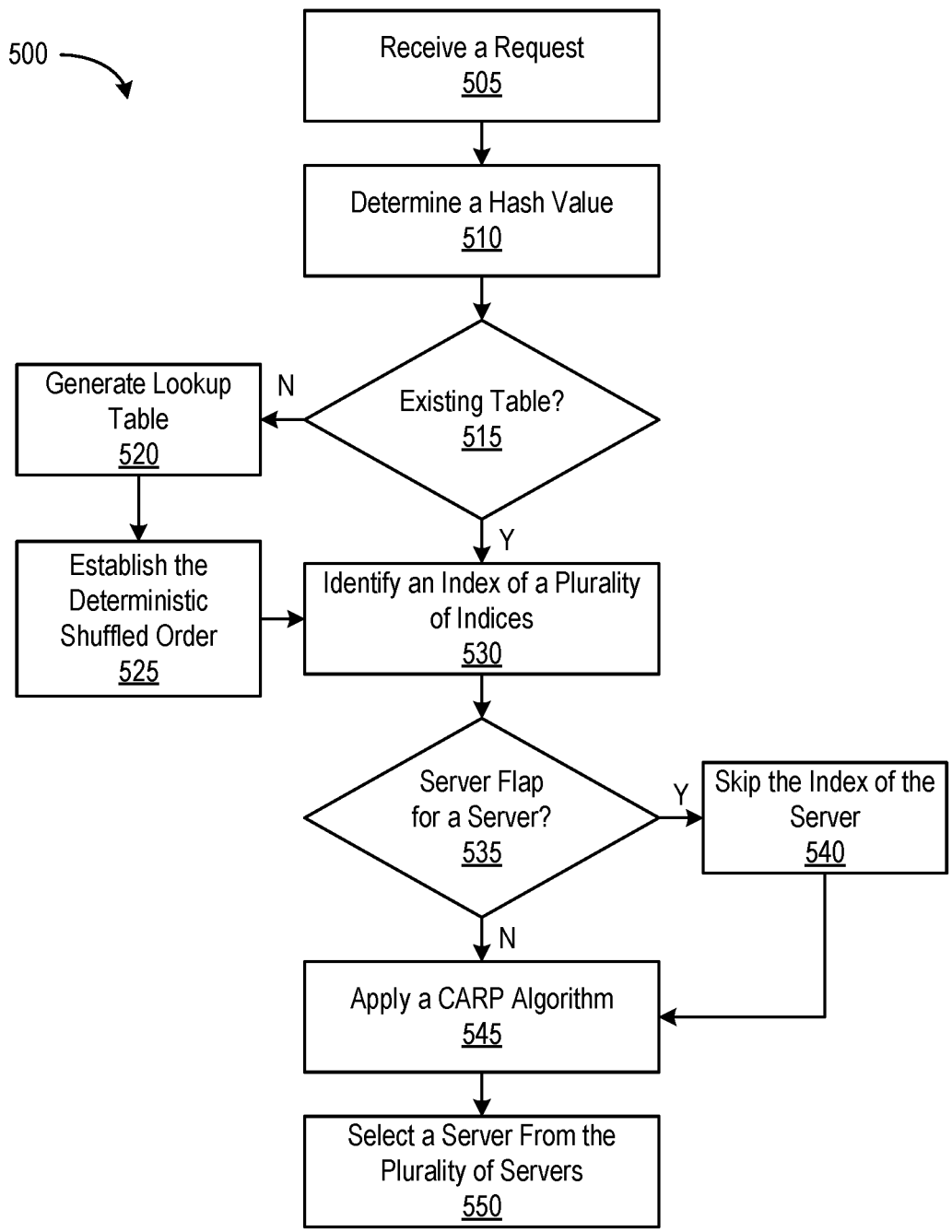
FIG. 5 is a flow diagram of a method for load balancing and distribution to nodes of a computing environment, in accordance with an embodiment.

Referring to FIG. 5, depicted is a flow diagram of a method for load balancing and distribution to nodes of a computing environment, in accordance with an embodiment. The example method 500 can be executed, performed, or otherwise carried out by one or more components of the system 200 (e.g., client devices 208, device 216, or servers 244), the computer 100, or any other computing devices described herein in conjunction with FIGS. 1A-B. The method 500 can include a device (e.g., a device intermediary to client devices and servers) receiving a request from a client to access one of the servers (505). The device can determine a hash value (510). The device can determine whether a table exists (515). The device can generate a lookup table (520). The device can establish the deterministic shuffled order for indices of the table (525). The device can identify an index of the various indices (530). The device can determine whether there is a server flap for a server (535). The device can skip the index of the server that is down (540). The device can apply a CARP algorithm (545). The device can select a server from the various servers listed in the table (550).

In further detail, the device can receive a request from one or more clients to access at least one of various servers (505). The device can be an intermediary between the clients (sometimes referred to as client device(s)) and the servers (sometimes referred to as computing node(s) or backend server endpoint(s)). The request can include, be, or be a part of a data packet or a message transmitted from the client device. In some cases, the device can intercept the request transmitted from the client to one of the servers. The device can receive the request to perform features or functionalities discussed herein for load balancing ("LB") by selecting one of the servers to service, handle, or otherwise respond to the request from the client.

At step 510, the device can determine or generate a hash value. The hash value can be based on at least a portion of the request received from the client. In this case, the hash value can include or refer to a client hash value determined for the request from the respective client. The device can determine the hash value by applying the hash function (e.g., a first hash function) on at least the portion of the request. The device can use or apply any hash function on the portion of the request to obtain the client hash value for indexing. The portion of the request can include at least one of a URL or an IP address. The portion can be a part of the configured parameters used to determine the client hash value. The configured parameter can be adjusted by the administrator of the device, such that other parameters or portions of the request can be used to determine the client hash value. The URL can be used to access a resource within one of the servers, such as application or web resources. In some cases, the portion of the messages can include other information or data within the request, such as some of the data stored on the client device.

At step 515, the device can determine whether a table exists. The table can include or be referred to as a hash table or a lookup table, for example. The device can use the table for indexing the client hash value into the table. For example, the device can perform a lookup into the database to determine whether a table having indices listing the servers is available. If the table is not available or has not been generated, the device can proceed to step 520. If the table is available for lookup or indexing, the device can proceed to step 530. The device can periodically update the table by communicating (e.g., exchanging data packets) with the servers to determine the status of the servers. For example, the device can update the table responsive to a timer configured to, for example, 1 second, 3 seconds, 5 seconds, 10 seconds, 30 seconds, 1 minute, etc. The status can refer to whether the server is available to handle more requests or whether the server is offline (e.g., down or flapped).

The device can update the table responsive to event information received from at least one of the servers. For example, the device can receive a message from one or more servers informing the device that the server is offline, down, or is otherwise unable to handle additional requests from clients. In another example, the device can receive a message from one or more servers indicating that the server is online or is available to handle requests from clients. The device can update the table according to the status of individual servers. For example, the device can update the table indicating that server flaps (e.g., up or down) similar to step 540. The device may not re-generate the table when adding or removing one or more servers. In some cases, the device can re-shuffle the indices within the table when adding a new server or removing a server. For example, the device can add the new server to an existing shuffled table and reshuffle the table. In another example, the device can add the new server to a table listing the servers (e.g., in the order of the server hash values or other predetermined order) and shuffle the table responsive to updating the table with all available or unavailable servers.

At step 520, the device can generate a lookup table (e.g., a hash table). The device can generate the table if there is no existing table listing the servers. If there is an existing table listing the servers, the device can update the table with additional information (e.g., flapping of servers), reshuffle the table, or proceed to index the client hash value into the table. The device can generate the table by establishing indices listing the various servers using a predetermined number of repetitions of each server. The device can order the server such that the same server (e.g., fingers associated with the same server) is not listed in adjacent indices. The device can establish the indices by calculating the server hashes for individual servers for the predetermined number of repetitions. The predetermined number of repetitions can refer to the number of fingers for individual servers. The number of fingers can be preconfigured by the administrator of the device, such as 4, 8, 10, 12, etc. The device can use at least formula (1) to generate the server hashes or indices for the table.

For example, the device can calculate the hash values for the individual servers (e.g., n number of servers). The device can repeat calculating the hash values of the individual servers for a predetermined number of repetitions (e.g., m number of repetitions). Hence, the device can determine or obtain a total of n*m number of indices for the table using formula (1). The device can calculate the values of $F_1$ and $F_2$ to compute the finger hash value. For example, the device can use formula (2) to calculate for $F_1$ by applying a hash function (e.g., any hash function discussed herein) to at least one of the IP address or a port of the server. The port can be the listener port of the server.

Individual fingers of the servers can include a different hash value, based on the difference of $F_2$ from formula (3), which can depend on the prime number selected based on the count of the repetition. For example, to calculate a server hash value for one of the servers in a first repetition, the device can use prime number P1 as the value for $F_2$. In further example, for the second repetition, the device can use prime number P2 as the value for the respective $F_2$. The device can repeat the method for calculating $F_2$ for other fingers. Using equation (4), $F_1$ and $F_2$ can be aggregated to determine the hash value for individual fingers. Responsive to generating the server hashes, the device can proceed to step 525 for shuffling the generated indices of the table.

At step 525, the device can establish the deterministic shuffled order for indices of the table. The device can use formula (6) for shuffling the server hashes to a deterministic shuffled order. For example, the device can use any deterministic shuffling function for formula (6) to obtain the shuffled indices. In some cases, the deterministic shuffling function can be any hash function. For example, the device can establish the deterministic shuffled order using a hash function (e.g., second hash function) that was applied to the IP address and listening port of each of the servers. This hash function (the second hash function) can be different from the hash function used to determine the client hash value. In some cases, the second hash function can be the same hash function used to obtain the client hash value.

The device can shuffle or order the indices listing the servers using prime numbers. The servers can be repeated multiple times in a deterministic shuffled order within the table. For example, the device can use prime numbers to select a slot for individual indices. The prime numbers can be preconfigured or prepopulated by the administrator of the device. In some cases, the device can download the prime numbers from a remote computing device or a server for shuffling the indices in a deterministic shuffled order. In another example, the device can use a prime number to determine how many times to shuffle the order of the indices for obtaining the deterministic shuffled order. With the generated and deterministically shuffled table, the device can index the client hash value into the table of indices.

At step 530, the device can identify an index of the various indices listing the servers repeated various times in a deterministic shuffled order. For example, the device can index the client hash value into the table having the indices of the finger hash values listing the servers. The index associated with the client hash value can be one of the potential servers for servicing the request from the client. Responsive to identifying the index, the device can identify a subset of the servers for potentially serving the request. The subset can include various servers for selection by the device. The table can include a first set of servers and the subset can include a second set of servers.

The number of indices included in the subset can be based on a window or a preconfigured range of indices for applying the CARP algorithm. The window or the subset can include a size predetermined to be a number of indices that is less than a number of servers within the table. For example, if there are 30 servers, the device can be configured to set the window size to 29 or below. In some cases, the window size or the subset size can be the same as or greater than the number of servers within the table. For example, if there are 8 servers in the table, the device may set the window size to 8. Hence, the device can consider all servers for calculating the hash value or score of the servers. The device can configure the size of the window based on the configuration by the administrator. For example, the device can be configured with a subset having a window size of eight indices before the index and eight indices after the index. Within the eight indices, either before or after the index, can include the index as part of the count. In this case, the window size can be 16 indices. The range of the window can be adjusted by the administrator. The device can be configured with other window sizes, such as 8, 12, 15, 17, 20, 32, etc.

At step 535, the device can determine whether there is a server flap for a server. For example, the device can identify a server flap for a first server in the various servers listed in a first index within the indices of the table. The device can determine or identify that the server is down based on the server being unresponsive to a message from the device requesting a response or the device not receiving any message from the respective server, for example. If at least one of the servers is down, the device can proceed to step 540. Otherwise, the device can proceed to step 545. The device can determine the status of the servers to mark, remove, or add one or more servers to the table accordingly.

At step 540, the device can skip the index of the server that is down. For example, the device can skip the first index of the first server that is down. To skip an index, the device can mark the downed server such that the device the listing of servers is absent of the first server when selecting the server to serve the client request. The device can maintain the server or the associated index within the table. In this case, the device can perform a lookup within the window skipping the marked index from consideration in servicing the request. Hence, if one of the servers within the window is down, the window can be sized one less than the original window size. In some cases, the device can expand the window size by the number of servers marked to be down. If the server is back online, the device can unmark or remove the mark from the table listing the servers, such that the device can select the first server as the potential choice for serving the request. After considering any unhealthy or downed servers, in this case, the device can proceed to step 545.

At step 545, the device can apply a CARP algorithm to the subset of servers or a second set of servers listed in the subset of indices around the index. The first set of servers in this case can refer to all the servers listed in the table. The device can apply CARP for individual indices or servers within the subset. If the first server is flapped or down, the device can apply CARP to the subset of indices absent or without applying CARP to the first server. In this case, the device can maintain the first server within the indices listing the servers repeated various times in the deterministic shuffled order. By maintaining the first server within the indices, if the window size is 16, the device can have a choice of selecting one of 15 indices within the table (e.g., one less per the downed first server). Once CARP is applied, the device can determine the hash values or hash scores for individual servers. The device can proceed to step 550 for selecting one of the servers.

At step 550, the device can select a server from the various servers listed in the table. The device can select the server to service the request from the client. The device can select the server from the second servers listed in the subset of indices. The device can select the server having the highest hash value or score based on the application of the CARP algorithm. For example, by applying CARP to the subset of indices, the device can determine the respective hash scores associated with the respective indices around the index of the client hash value indexed into the table. The device can select the index (e.g., any index within the subset) having the highest hash value among other indices for serving the request. Accordingly, the device can transmit, responsive to selecting a server, the request or data packets from the client to the server associated with the selected index.

In some cases, the device can re-select indices for one or more requests transmitted to servers that are down. For example, the device can identify that at least a server handling one or more requests from the respective clients is down. The device can identify the subset of indices for the respective request. The device can obtain the hash values or hash scores for the individual indices within the subset, absent the downed server. The device can select the highest hash value for individual requests to redistribute the requests to another server, different from the downed server. In this case, the highest hash value can be the second highest hash value below the downed server. When the downed server is back online, the device can redirect requests that were previously distributed to other servers back to the server that came back online, for example.

FURTHER EXAMPLE EMBODIMENTS

The following examples pertain to further embodiments, from which numerous permutations and configurations will be apparent.

Example 1 includes a method including: receiving, by receiving, by a device that is intermediary to a plurality of clients and a plurality of servers, a request from a client of the plurality of clients to access one of the plurality of servers; determining, by the device, a hash value based on at least a portion of the request received from the client; identifying, by the device using the hash value, an index of a plurality of indices listing the plurality of servers repeated a plurality of times in a deterministic shuffled order; applying, by the device, a cache array routing protocol (CARP) algorithm to a second plurality of servers listed in a subset of the plurality of indices around the index; and selecting, by the device to service the request, a server from the second plurality of servers listed in the subset of the plurality of indices with a highest hash value based on the application of the CARP algorithm.

Example 2 includes the subject matter of Example 1, further comprising determining the hash value by applying a hash function on at least the portion of the request comprising at least one of a uniform resource locator (URL) or an internet protocol (IP) address.

Example 3 includes the subject matter of any one of Examples 1 and 2, wherein one or more prime numbers are used to list the plurality of servers in the plurality of indices the plurality of times in the deterministic shuffled order.

Example 4 includes the subject matter of any one of Examples 1 through 3, wherein a size of the subset of the plurality of indices is predetermined to be a number of indices that is less than a number of servers in the plurality of servers.

Example 5 includes the subject matter of any one of Examples 1 through 4, wherein the subset of the plurality of indices comprises eight indices before the index and eight indices after the index.

Example 6 includes the subject matter of any one of Examples 1 through 5, further comprising establishing, by the device, the deterministic shuffled order using a second hash function applied to an internet protocol address and listening port of each of the plurality of servers.

Example 7 includes the subject matter of any one of Examples 1 through 6, further comprising establishing, by the device, the plurality of indices listing the plurality of servers using a predetermined number of repetitions of each server of the plurality of servers such that a same server is not listed in adjacent indices of the plurality of indices.

Example 8 includes the subject matter of any one of Examples 1 through 7, further comprising: identifying, by the device, a server flap for a first server in the plurality of servers listed in a first index within the plurality of indices; skipping, by the device, the first index to identify the second plurality of servers listed in the subset of the plurality of indices around the index, the second plurality of servers absent the first server; and applying, by the device, the CARP algorithm to the subset of the plurality of indices absent the first server, wherein the device maintains the first server in the plurality of indices listing the plurality of servers repeated the plurality of times in the deterministic shuffled order.

Example 9 includes a system including: a device comprising one or more processors and memory that is intermediary to a plurality of clients and a plurality of servers, the device to: receive a request from a client of the plurality of clients to access one of the plurality of servers; determine a hash value based on at least a portion of the request received from the client; identify, using the hash value, an index of a plurality of indices listing the plurality of servers repeated a plurality of times in a deterministic shuffled order; apply a cache array routing protocol (CARP) algorithm to a second plurality of servers listed in a subset of the plurality of indices around the index; and select, to service the request, a server from the second plurality of servers listed in the subset of the plurality of indices with a highest hash value based on the application of the CARP algorithm.

Example 10 includes the subject matter of Example 9, wherein the device is further configured to determine the hash value by application of a hash function on at least the portion of the request comprising at least one of a uniform resource locator (URL) or an internet protocol (IP) address.

Example 11 includes the subject matter of any one of Examples 9 and 10, wherein one or more prime numbers are used to list the plurality of servers in the plurality of indices the plurality of times in the deterministic shuffled order.

Example 12 includes the subject matter of any one of Examples 9 through 11, wherein a size of the subset of the plurality of indices is predetermined to be a number of indices that is less than a number of servers in the plurality of servers.

Example 13 includes the subject matter of any one of Examples 9 through 12, wherein the subset of the plurality of indices comprises eight indices before the index and eight indices after the index.

Example 14 includes the subject matter of any one of Examples 9 through 13, wherein the device is further configured to establish the deterministic shuffled order using a second hash function applied to an internet protocol address and listening port of each of the plurality of servers.

Example 15 includes the subject matter of any one of Examples 9 through 14, wherein the device is further configured to establish the plurality of indices listing the plurality of servers using a predetermined number of repetitions of each server of the plurality of servers such that a same server is not listed in adjacent indices of the plurality of indices.

Example 16 includes the subject matter of any one of Examples 9 through 15, wherein the device is further configured to: identify a server flap for a first server in the plurality of servers listed in a first index within the plurality of indices; skip the first index to identify the second plurality of servers listed in the subset of the plurality of indices around the index, the second plurality of servers absent the first server; and apply the CARP algorithm to the subset of the plurality of indices absent the first server, wherein the device maintains the first server in the plurality of indices listing the plurality of servers repeated the plurality of times in the deterministic shuffled order.

Example 17 includes a non-transitory computer readable medium storing instructions that, when executed by one or more processors, cause the one or more processors to: maintain a list of a plurality of servers from which to select a server from the plurality of servers to receive client traffic, wherein each of the plurality of servers are repeated multiple times within the list in a deterministic shuffled order; compute a hash on at least a portion of a request received from a client to access one of the plurality of servers; identify, using the hash, an index into the list of the plurality of servers; apply a cache array routing protocol (CARP) algorithm to a second plurality of servers listed in a window of a predetermined number of indices around the index in the list of the plurality of servers; and select, to service the request of the client, a highest hashed server identified by the CARP algorithm from the second plurality of servers.

Example 18 includes the subject matter of Example 17, further comprising instructions that, when executed by the one or more processors, cause the one or more processors to compute the hash on at least the portion of the request comprising at least one of a uniform resource locator (URL) or an internet protocol (IP) address.

Example 19 includes the subject matter of any one of Examples 17 and 18, wherein one or more prime numbers are used to generate the list of the plurality of servers in the deterministic shuffled order.

Example 20 includes the subject matter of any one of Examples 17 through 19, wherein the window of the predetermined number of indices is predetermined to be a number of indices that is less than a number of servers in the plurality of servers.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:
receiving, by a device that is intermediary to a plurality of clients and a plurality of servers, a request from a client of the plurality of clients to access one of the plurality of servers;
determining, by the device, a hash value based on at least a portion of the request received from the client;
identifying, by the device using the hash value, an index of a plurality of indices listing the plurality of servers repeated a plurality of times in a deterministic shuffled order;
applying, by the device, a cache array routing protocol (CARP) algorithm to a second plurality of servers listed in a subset of the plurality of indices around the index; and
selecting, by the device to service the request, a server from the second plurality of servers listed in the subset of the plurality of indices with a highest hash value based on the application of the CARP algorithm.

2. The method of claim 1, further comprising determining the hash value by applying a hash function on at least the portion of the request comprising at least one of a uniform resource locator (URL) or an internet protocol (IP) address.

3. The method of claim 1, wherein one or more prime numbers are used to list the plurality of servers in the plurality of indices the plurality of times in the deterministic shuffled order.

4. The method of claim 1, wherein a size of the subset of the plurality of indices is predetermined to be a number of indices that is less than a number of servers in the plurality of servers.

5. The method of claim 1, wherein the subset of the plurality of indices comprises eight indices before the index and eight indices after the index.

6. The method of claim 1, further comprising establishing, by the device, the deterministic shuffled order using a second hash function applied to an internet protocol address and listening port of each of the plurality of servers.

7. The method of claim 1, further comprising establishing, by the device, the plurality of indices listing the plurality of servers using a predetermined number of repetitions of each server of the plurality of servers such that a same server is not listed in adjacent indices of the plurality of indices.

8. The method of claim 1, further comprising:
identifying, by the device, a server flap for a first server in the plurality of servers listed in a first index within the plurality of indices;
skipping, by the device, the first index to identify the second plurality of servers listed in the subset of the plurality of indices around the index, the second plurality of servers absent the first server; and
applying, by the device, the CARP algorithm to the subset of the plurality of indices absent the first server, wherein the device maintains the first server in the plurality of indices listing the plurality of servers repeated the plurality of times in the deterministic shuffled order.

9. A system, comprising:
a device comprising one or more processors and memory that is intermediary to a plurality of clients and a plurality of servers, the device to:
receive a request from a client of the plurality of clients to access one of the plurality of servers;
determine a hash value based on at least a portion of the request received from the client;
identify, using the hash value, an index of a plurality of indices listing the plurality of servers repeated a plurality of times in a deterministic shuffled order;
apply a cache array routing protocol (CARP) algorithm to a second plurality of servers listed in a subset of the plurality of indices around the index; and
select, to service the request, a server from the second plurality of servers listed in the subset of the plurality of indices with a highest hash value based on the application of the CARP algorithm.

10. The system of claim 9, wherein the device is further configured to determine the hash value by application of a hash function on at least the portion of the request comprising at least one of a uniform resource locator (URL) or an internet protocol (IP) address.

11. The system of claim 9, wherein one or more prime numbers are used to list the plurality of servers in the plurality of indices the plurality of times in the deterministic shuffled order.

12. The system of claim 9, wherein a size of the subset of the plurality of indices is predetermined to be a number of indices that is less than a number of servers in the plurality of servers.

13. The system of claim 9, wherein the subset of the plurality of indices comprises eight indices before the index and eight indices after the index.

14. The subset of claim 9, wherein the device is further configured to establish the deterministic shuffled order using a second hash function applied to an internet protocol address and listening port of each of the plurality of servers.

15. The system of claim 9, wherein the device is further configured to establish the plurality of indices listing the plurality of servers using a predetermined number of repetitions of each server of the plurality of servers such that a same server is not listed in adjacent indices of the plurality of indices.

16. The system of claim 9, wherein the device is further configured to:
identify a server flap for a first server in the plurality of servers listed in a first index within the plurality of indices;
skip the first index to identify the second plurality of servers listed in the subset of the plurality of indices around the index, the second plurality of servers absent the first server; and
apply the CARP algorithm to the subset of the plurality of indices absent the first server, wherein the device maintains the first server in the plurality of indices listing the plurality of servers repeated the plurality of times in the deterministic shuffled order.

17. A non-transitory computer readable medium storing instructions that, when executed by one or more processors, cause the one or more processors to:
maintain a list of a plurality of servers from which to select a server from the plurality of servers to receive client traffic, wherein each of the plurality of servers are repeated multiple times within the list in a deterministic shuffled order;
compute a hash on at least a portion of a request received from a client to access one of the plurality of servers;
identify, using the hash, an index into the list of the plurality of servers;
apply a cache array routing protocol (CARP) algorithm to a second plurality of servers listed in a window of a predetermined number of indices around the index in the list of the plurality of servers; and select, to service the request of the client, a highest hashed server identified by the CARP algorithm from the second plurality of servers.

18. The non-transitory computer readable medium of claim 17, further comprising instructions that, when executed by the one or more processors, cause the one or more processors to compute the hash on at least the portion of the request comprising at least one of a uniform resource locator (URL) or an internet protocol (IP) address.

19. The non-transitory computer readable medium of claim 17, wherein one or more prime numbers are used to generate the list of the plurality of servers in the deterministic shuffled order.

20. The non-transitory computer readable medium of claim 17, wherein the window of the predetermined number of indices is predetermined to be a number of indices that is less than a number of servers in the plurality of servers.

* * * * *